(12) United States Patent
Pesaturo et al.

(10) Patent No.: US 12,516,389 B2
(45) Date of Patent: Jan. 6, 2026

(54) MICRODOT ARRAY HAVING PCR-PRIMERS FIXED IN EACH MICRODOT AND METHOD OF FORMING THE SAME ON A SUBSTRATE FOR GENE BASED PATHOGEN DETECTION

(71) Applicant: STMICROELECTRONICS S.r.l., Agrate Brianza (IT)

(72) Inventors: Massimiliano Pesaturo, Torre de' Roveri (IT); Lillo Raia, Desio (IT); Salvatore Petralia, Paternò (IT); Domenico Giusti, Caponago (IT); Marco Ferrera, Concorezzo (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 944 days.

(21) Appl. No.: 17/531,313

(22) Filed: Nov. 19, 2021

(65) Prior Publication Data

US 2023/0160024 A1     May 25, 2023

(51) Int. Cl.

| | |
|---|---|
| C12Q 1/68 | (2018.01) |
| B01L 3/00 | (2006.01) |
| B01L 7/00 | (2006.01) |
| B41M 5/00 | (2006.01) |
| C12Q 1/6806 | (2018.01) |
| C12Q 1/686 | (2018.01) |
| C12Q 1/70 | (2006.01) |

(52) U.S. Cl.
CPC .............. C12Q 1/701 (2013.01); B01L 3/527 (2013.01); B01L 7/52 (2013.01); B41M 5/0023 (2013.01); C12Q 1/6806 (2013.01); C12Q 1/686 (2013.01); *B01L 2200/0647* (2013.01); *B01L 2200/0689* (2013.01); *B01L 2200/12* (2013.01); *B01L 2200/16* (2013.01); *B01L 2300/0819* (2013.01); *B01L 2300/16* (2013.01)

(58) Field of Classification Search
None
See application file for complete search history.

(56) References Cited

U.S. PATENT DOCUMENTS

| | | | |
|---|---|---|---|
| 8,901,287 B2 | 12/2014 | Nazarenko et al. | |
| 9,745,624 B2 | 8/2017 | Wangh et al. | |
| 9,777,317 B2 | 10/2017 | Spoto et al. | |
| 2012/0170608 A1 | 7/2012 | Bianchessi et al. | |
| 2015/0044110 A1 | 2/2015 | Colombo et al. | |
| 2016/0130642 A1 | 5/2016 | Alessi et al. | |
| 2023/0160024 A1* | 5/2023 | Pesaturo | C12Q 1/701 506/4 |

OTHER PUBLICATIONS

De Los Cobos et al., 2012. Tunable multifunctional mesoporous silica microdots arrays by combination of inkjet printing, EISA, and click chemistry. Chemistry of Materials, 24(22), pp. 4337-4342. (Year: 2012).*
Fan et al., 2018. Silver nanoclusters encapsulated into metal-organic frameworks with enhanced fluorescence and specific ion accumulation toward the microdot array-based fluorimetric analysis of copper in blood. ACS sensors, 3(2), pp. 441-450. (Year: 2018).*
Le Goff et al., 2013. Shrinking hydrogel—DNA spots generates 3D microdots arrays. Macromolecular Bioscience, 13(2), pp. 227-233. (Year: 2013).*
Zhang et al., 2010. A microfluidic device with microbead array for sensitive virus detection and genotyping using quantum dots as fluorescence labels. Biosensors and Bioelectronics, 25(11), pp. 2402-2407. (Year: 2010).*
Liu et al., 2017. Digital quantification of gene methylation in stool DNA by emulsion-PCR coupled with hydrogel immobilized beadarray. Biosensors and Bioelectronics, 92, pp. 596-601. (Year: 2017).*
Sun et al., 2014. A novel picoliter droplet array for parallel real-time polymerase chain reaction based on double-inkjet printing. Lab on a Chip, 14(18), pp. 3603-3610. (Year: 2014).*
Wang et al., 2016. Digital PCR using micropatterned superporous absorbent array chips. Analyst, 141(12), pp. 3821-3831. (Year: 2016).*
Xiao et al., 2006. An improved gel-based DNA microarray method for detecting single nucleotide mismatch. Electrophoresis, 27(19), pp. 3904-3915. (Year: 2006).*
Adessi et al., "Solid phase DNA amplification: characterisation of primer attachment and amplification mechanisms," *Nucleic Acids Research* 28(20 e87): 2000, pp. 1-8.
Petralia et al., "A miniaturized silicon based device for nucleic acids electrochemical detection," *Sensing and Bio-Sensing Research* 6:90-94, 2015.
Guarnaccia et al., "Is this the real time for genomics?" *Genomics* 103:177-182, 2014.
Kadimisetty et al., "Fully 3D printed integrated reactor array for point-of-care molecular diagnostics," *Biosensors and Bioelectronics* 109:156-163, 2018.

(Continued)

*Primary Examiner* — Gary Benzion
*Assistant Examiner* — Olayinka A Oyeyemi
(74) *Attorney, Agent, or Firm* — Seed IP Law Group LLP

(57) ABSTRACT

A substrate has a plurality of microdots positioned thereon. Each microdot contains one or more primers for gene amplification for a particular target gene. The microdots are placed on the substrate and the substrate is positioned in a housing. The housing has a sample fluid to be tested introduced therein covering the microdot array. While the sample fluid is overlying the substrate, the amplification of the target gene is carried out if it is present within the sample. If the target gene that matches the primers is not present, then amplification will not take place. The fluid also contains fluorophores which will be fixed into the gene as it increases in size as it clearly detects if gene amplification has occurred by detecting the amount of light detected for a particular microdot. In a preferred embodiment, the sample fluid is placed on top of a sealing layer that is less dense then water, such as wax or mineral oil. During a heating of the sample fluid and sealing layer, the sample fluid will sink to the bottom of the sealing layer so that it is fully encased and protected.

20 Claims, 19 Drawing Sheets

(56) References Cited

OTHER PUBLICATIONS

Kukhtin et al., "Lab-on-a-Film disposable for genotyping multidrug-resistant Mycobacterium tuberculosis from sputum extracts," *Lab Chip* 19(7):1217-1225, 2019.
Wang et al., "Point-of-care diagnostics for infectious diseases: From methods to devices," *Nano Today* 37: Apr. 2021, 115 pages.

\* cited by examiner

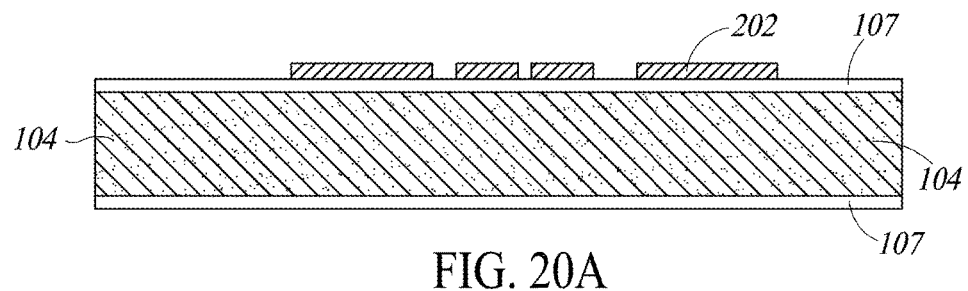
FIG. 20A
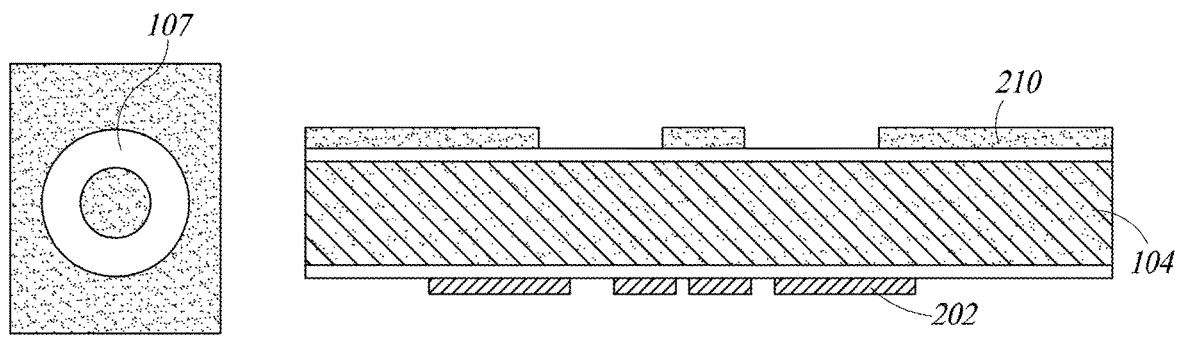
FIG. 20C
FIG. 20B
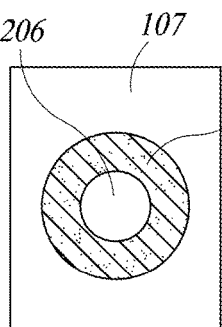
FIG. 20E
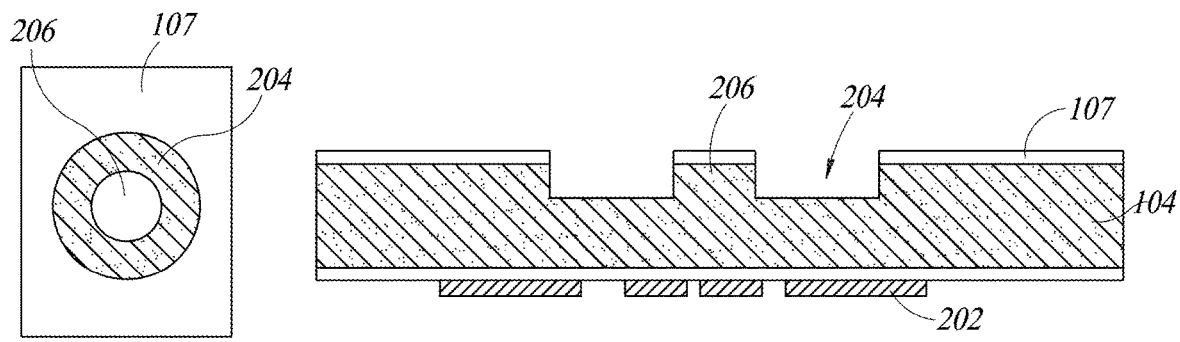
FIG. 20D

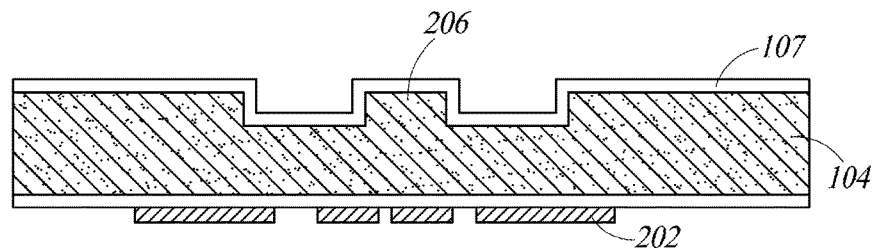
FIG. 21A
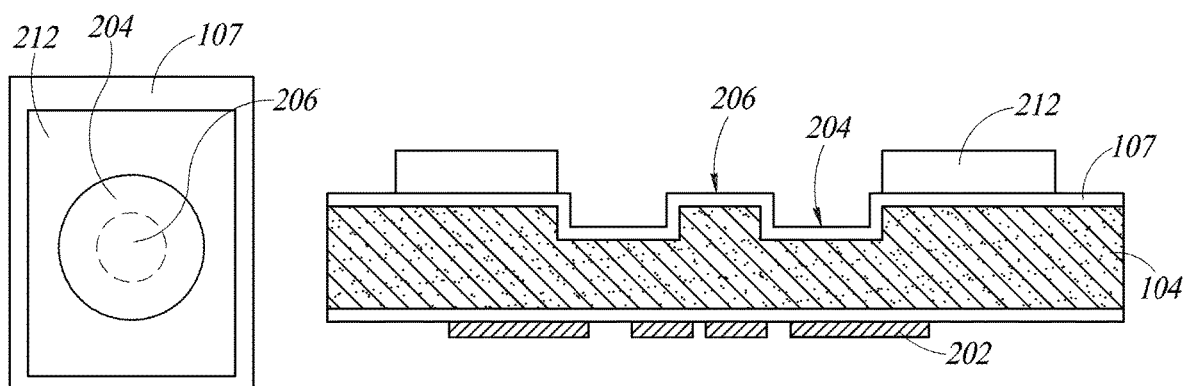
FIG. 21C
FIG. 21B
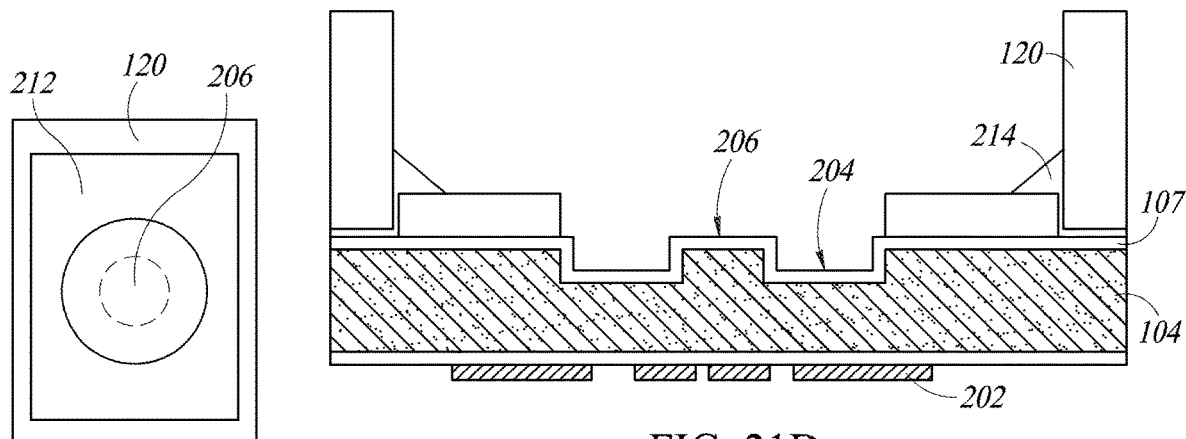
FIG. 21E
FIG. 21D

MICRODOT ARRAY HAVING PCR-PRIMERS FIXED IN EACH MICRODOT AND METHOD OF FORMING THE SAME ON A SUBSTRATE FOR GENE BASED PATHOGEN DETECTION

BACKGROUND

Technical Field

The present disclosure relates to a Lab-on-Chip having microdots that contain selected gene primers, and in particular, to a method and apparatus for providing gene amplification based on primers positioned in microdots on a silicone substrate.

Description of the Related Art

Accurate and quick diagnosis is a key element in effective identification and treatment of infectious diseases. The continued advance of point-of-care (PoC) diagnostic technology holds the potential to revolutionize healthcare in terms of practices, cost and logistics, also removing the limit and the ambiguity of diagnoses based on clinical signs and results based on microbiological cultures. Lab-on-Chip (LoC) devices are pivotal to scale down laboratory processes, multiple stages of samples handling, trained clinicians, laboratory equipment, and financial investments, providing all of them in one single microchip. Sample processing like amplification PCR or LAMP, hybridization and detection, occurs entirely on-chip, limiting contamination and avoiding handling from expert technicians and making diagnosis more robust.

Pathogen detection typically is targeting two types of molecules: Proteins, like antibodies or antigens, and Nucleic Acids, such as DNA and RNA. While antibodies and antigens can be identified using enzyme-linked immunosorbent assay (ELISA), DNA detection is usually performed by identifying the presence of a specific target sequence associated with the pathogen, using amplification as Polymerase Chain Reaction (PCR), LAMP or qPCR, to increase the target strands initially present inside the sample.

This technique, often referred to as Nucleic Acid Amplification Testing (NAAT), is more prone to be integrated inside the Lab-on-Chip Platform, creating a sample-to-result device.

Detection of specific strands of DNA is performed with several techniques, ranging from the optical to the electrochemical. Many optical methods have been developed utilizing fluorescence dyes but also including Raman scattering and Plasmon resonance. Most of these techniques require several handling and washing steps in liquid or hybridization of probes on the spotted microarray.

Currently, a variety of Lab-on-Chip products are provided in the marketplace. |Lab-on-Chips are useful for various medical diagnostic purposes, among them gene amplification and other medical uses. Such current Lab-on-Chips require a number of cycles of amplification, hybridization, and washing, as well as a number of other sequences to take place in order determine the results of a PCR that has occurred within the reaction chamber. This can result in a high cost and in some cases, be a time-consuming process. In addition, the reaction chamber must be specially prepared and remain properly sterilized in order to ensure the PCR amplification process is properly carried out. While such Lab-on-Chip gene amplification products on the market today have certain uses, a product which is lower in cost, provides faster reaction times, and is more reliable would be beneficial.

BRIEF SUMMARY

Disclosed herein are a method and structure for detecting the presence of a target DNA or gene using RT-qPCR amplification of the gene being tested for. According to principles of the present disclosure, a substrate has a plurality of microdots formed thereon. Each microdot contains one or more primers for gene amplification. In one embodiment, a pair of primers that include forward and reverse primers are present, while in another embodiment, just one primer is present. In each embodiment, the primer will hybridize to a particular target gene to be tested. While having primers that are forward and reverse primers are beneficial, any other primer combination that results in gene amplification is acceptable for attaching to a target gene to be tested. The microdots are placed on the substrate, having the primers located within the microdots. After being placed on the substrate, they are annealed and stabilized so that the primers remain vital and available for use for an extended period of time, up to several months.

When the test is to be carried out, the substrate having the microdots containing the primers thereon is positioned in a housing. The housing has a fluid to be tested introduced therein covering the microdot array. While the fluid is present overlying the substrate, the amplification of the gene is carried out causing any gene within that particular fluid to extend and create increased length gene chains. The fluid also contains fluorophores which will be fixed into the gene as intercalating fluorophores in the gene when it continues to increase in size as it amplifies in the particular microdot. Concurrently with the RT-qPCR cycles being carried out, the microdots are subjected to an excitation energy, such as by applying a laser light, UV light, or other acceptable excitation energy that will cause the fluorophores to output light that are present within the gene. As the amplification cycles are carried out, fluorescent light will be emitted from the microdots on which the target gene is being hybridized. As the length of the target gene grows, it will increase the fluorescence intensity at those particular locations where it grows. For those microdots which output light, this will be sensed and provide an indication that the target gene for those particular microdots is present in the sample under test.

According to one embodiment, the disclosure provides for a substrate which has an array of microdots thereon, with various sets of microdots having primers therein that are fixed and viable in order to attach to a particular target gene that matches the specific primers of that microdot. This structure is placed in a storage location and maintained as active and available until used at a later time. If desired, for this embodiment, the substrate can be placed into a housing and held in storage. At a future time, testing of a gene sample can carried out by placing the sample in a fluid and applying the fluid to the substrate while gene amplification takes place.

According to another embodiment, after the amplification has occurred and the presence of the target gene has been sensed and the results provided, the sample fluid is removed, the substrate washed and a new fluid is placed on the microarray positioned on the substrate. The additional fluid performs a denature process of the amplified gene present on the microdots in order to make the microdots available to receive additional genes. This additional fluid also contains specific beacon probes that will attach to different types of the target gene, strands of which may be left on the microdots which hybridize the target gene. Accordingly, different variations of the particular gene can be sensed using the beacon probes. Each beacon probe will output a different color of light depending on the particular variation and its attachment to a microdot.

The present disclosure provides a substrate having an array of microdots that are stabilized thereon, each microdot containing a plurality of primers that will attach to and hybridize with a selected target gene. This provides the benefit that the substrate can be stored and shipped, and maintained in a ready position for use at a future date. It also provides the benefit that the excitation of the microdots is carried out concurrently with the amplification of the gene using the RT-qPCR process, thus sensing whether the target gene is present or not during the amplification process itself, so the results can be rapidly determined.

BRIEF DESCRIPTION OF THE SEVERAL VIEWS OF THE DRAWINGS

FIGS. 20A to 20E are various views of the process of fabricating the substrate for a microdot array according to one embodiment of the disclosure herein.

FIGS. 21A to 21E are various views of additional steps after FIG. 20D of the process of fabricating the substrate for a microdot array according to one embodiment of the disclosure herein.

DETAILED DESCRIPTION

Figure 1:
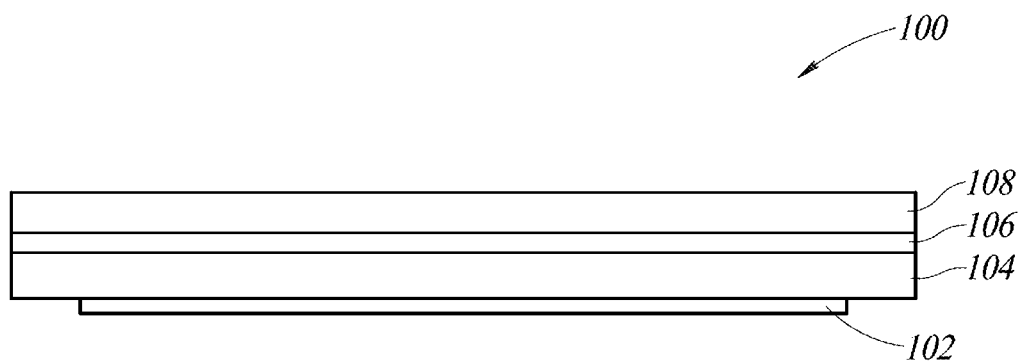
FIG. 1 is a side view of a starting substrate for receiving microdots according to principles of the present disclosure.

FIG. 1 illustrates an apparatus 100 having a support base 102, a substrate 104, and a gene fixing substrate 108 overlying an intermediate substrate 106. According to one embodiment, the support member 102 can be any acceptable member to rigidly hold the substrate 104 in place during the preparation process of the microarray substrate. This can be a large metal plate, a large wafer, such as a silicon wafer, or other structure which is capable of supporting other layers during the manufacturing process. The substrates 102 and 104 can be a base glass substrate, a silicon substrate, or any acceptable substrate having sufficient strength to support its own weight, and that of other layers on top of it. According to one embodiment, the layer 104 is a printed circuit board type structure, such as a PCB having alternating layers of fiberglass and conductors and insulators. In other embodiments, the layer 104 is plastic, glass or other low cost substrate. The layer 106 is preferably a silicon layer, whether polysilicon, single crystal silicon, or other layer, that can be easily adhered to the substrate 104 and is also compatible to receive the gene fixing layer 108. The gene fixing layer 108 can be any material that is compatible with having gene material fixed thereon, which may include single crystal silicon, glass, TEOS layer, silicon Nitride, polymers, metal oxide nanostructured layer metal(0) nanostructured layer, quartz, or other material that can have a high degree of purity, as well as receive various anchoring layers for connection to gene structures. The thickness and footprint area of the layers 102, 104, 106 and 108 are not drawn to scale. In most embodiments, layer 102 will be the largest in area and the thickest.

Each reference to gene structures, gene, genes, an amplicon, DNA, RNA or the like, includes within its meaning any genetic material and reference to any of these elements in the specification and claims should be interpreted broadly to include a few strands of a genetic material, part of a gene, part or all of a DNA strand, part or all of an RNA strand, part or all of a chromosome or any form of genetic material.

The material selected for the layer 108, and in some embodiments layers 106 and 104, is based at least in part on the layer material being able to assist in recognizing and sensing the change in the optical properties of the gene material as amplified. A single crystal silicon, quartz, polycrystalline silicon, a silicon based compound, such as silicon nitride or silicon oxide and other materials that improve the ability to detect changes in the optical properties of the materials positioned thereon are preferred for one or more of the layers 104, 106 and 108.

Figure 2:
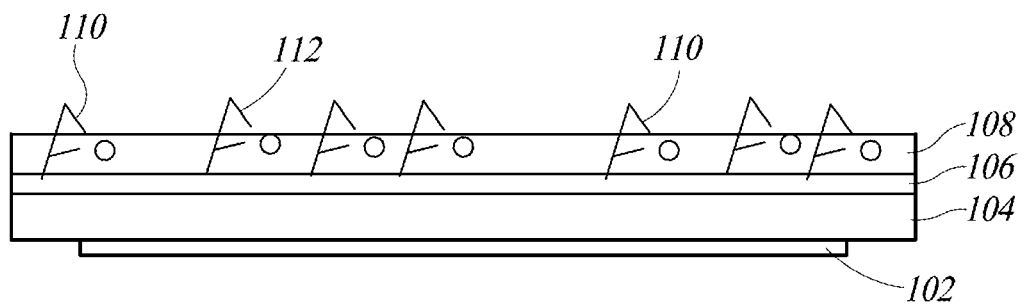
FIG. 2 is a side view of the substrate of FIG. 1 in the next step of the process in preparation to receive the microdots.

FIG. 2 illustrates the microarray apparatus 100 after a preparation sequence of steps has been carried out. According to one embodiment, the upper layer 108 is subjected to cleaning and activation processes (such as $O_2$ plasma treatment, oxidizing $H2O:H2O2:NH4OH$ solution, etc.), thus providing a hydroxyl enhanced layer on top of the substrate 108. After this, a chemical reaction process is carried out in order to provide a reactive termination groups coating 110 on the substrate 108 surface. In one embodiment, a TEOS layer is formed on top of the substrate 108. The TEOS layer can provide a crosslinking for silicon polymers in order to provide a stable and highly adhesive attaching surface for structures later to be applied to the substrate 108. There are various acceptable methods known in the art for forming the TEOS surface and the reactive termination group coating. These include using vapor phase deposition of epoxy-silane, followed by the appropriate heating cycles. The use of epoxy silane as an adhesion promotor is known in the art, and any acceptable technique for forming a silane adhesive promoter, including an epoxy silane adhesion promoter, may be carried out. The adhesion promotors 110 are placed on the substrate 108, either as a blanket layer or at selected locations which are to receive the microdots as described subsequently herein. Alternatively, instead of using the epoxy O-ring with silane for the anchor layer, a general-X reactive termination for primer anchoring can be used.

Figure 3:
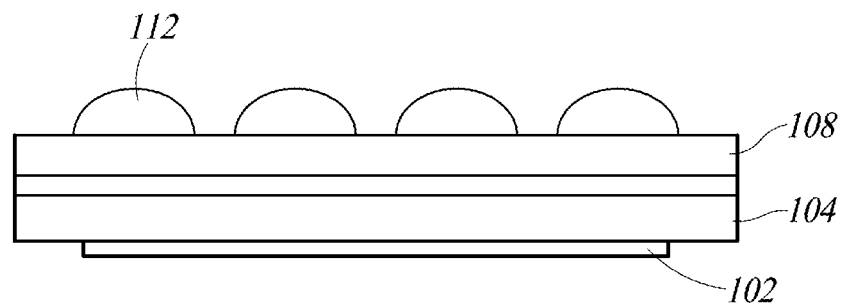
FIG. 3 is a side view of a plurality of microdots as deposited on the substrate according to a next step in the process of fabricating a microdot array according to the disclosure herein.

FIG. 3 is a side view of an end of the substrate illustrating that microdots 112 have been applied to the substrate 108. The microdots 112 are applied after the appropriate preparation by the epoxy silane adhesion layer has been applied (layer 110), preferably at specific locations in order to anchor the microdots solidly at the desired location in order to form the microdot array.

The microdots 112 are prepared and placed according to the following method. According to the methods as disclosed herein the microdots 112 could be composed by a pairs of primers forward (FW) and reverse (Rev) at various FW/Rev ratio ranging from 90:10 to 10:90, or by a single primer.

The first embodiment will be used for the detection of double stranded DNA or RNA, genes such as bacteria (*Mycobacterium tuberculosis*, sepsis bacteria, etc.), fungi (*Candida albicans*, etc.), protozoans, DNA-virus (hepatitis B virus) and virus-dsRNA (such as Rotavirus, Infectious bursal disease virus, etc.), while the single primer embodiment in used for the detection of pathogen Virus-ssRNA such as SARS cov-2 with a gene single strand RNA.

A primer is a short single strand of a DNA sequence that is used in a RT-qPCR technique. In the RT-qPCR method, a pair of primers is used to hybridize with a specific strands of genome dsDNA and therefore defines the region at which a gene will be amplified. In a standard RT-qPCR process the gene is first denatured by thermal process to form single strands DNA (denaturation process). Selected primers that are custom to have a particular target DNA adhere to them (annealing process) and then the amplification process mediated by enzyme polymerase can take place (extension process). Usually the RT-qPCR experiments are properly designed to have the same temperature for annealing and for the extension process, in order to have a twostep RT-qPCR reaction. The specificity of amplification reaction is mediated by the primers. For example, a pair of forward and reverse primers are used which are customized to a particular target locus to allow for amplification of a particular target gene DNA strand, but will not hybridize other gene strands. Thus, there are known primers which can match to a particular type of pathogen gene (DNA or RNA), for example, a pair of primers FW and Rev (at various molar ratio from 90:10 to 10:90), that can match to and hybridize a specific gene double strand DNA of bacteria (such as *A. streptococcus, A. Staphylococcus*) or DNA virus (such as Hepatitis B virus, etc.). Regarding the pathogen RNA virus with single strand such as COVID 19 (also known as SARS-CoV-2) or double strands gene such as Rotavirus, two embodiments can be used and here discloses:

1) Reverse transcriptase on fluid: pathogen gene RNA is firstly reverse transcribed to cDNA, then the pair primers into the microdots matched to the cDNA amplicons are extended in real time mode generating strands complementary to the extended probes.
2) Surface reverse transcriptase: a) for single strand RNA virus, the whole gene is recognized by a microdot containing a specific single primer anchored at surface, then the reverse transcriptase amplification at surface is carried out; b) for double-strand RNA gene virus, the whole gene is recognized by a pair of specific FW/Rev primers on microdots, than the reverse transcriptase PCR at surface is carried out.

Other pathogens for which primers are known include the PAN1, PAN2, and other potential target viruses that might be present in the sample taken. There will be, of course, future pathogens, including viruses, bacteria, fungi, protozoa and other organic material for which primers either currently exist or can easily be constructed in order to perform the RT-qPCR technique.

According to the methods as disclosed herein, a pair of specific primers (at various molar ratio) or a single primer for growing the target DNA to be tested, are mixed into a so-called printing-fluid. It is composed of various components such as saline buffer (phosphate, Tris, etc.) and low amounts of additives (from 1 to 10% of DMSO, glycerol, surfactants etc.), to obtain proper fluid characteristics (such as density, viscosity, polarity, etc.), to obtain uniform microdots at the surface. They are then made stable in the fluid for future linking to a target DNA when it becomes available. The fluid is then placed onto the substrate 108 as microdots as disclosed herein. In this particular example, the fluid is placed on the substrate 108 after the appropriate anchoring layers have been formed on the substrate 108 in order to fix and stabilize the microdots containing the viable primers.

The microdots can be formed on the substrate 108 using the starting fluid by any acceptable technique. One technique that is acceptable is to feed the fluid into a jet printer-type of structure, such as the type used for inkjet printers, the spraying of fine aerosols, or other microprinting devices. A type of inkjet printer will be selected which uses a pressure change diaphragm, a piezoelectric layer, or other pressure change member, in order to output the fluid. While it is known in inkjet printing that some types of inkjet printers use a heater which boils the fluid and causes the fluid to be ejected at a high temperature, such inkjet printers will likely destroy the DNA in the microdot and thus will not be used. Accordingly, an inkjet printer which operates at low temperature and to eject the fluid at a cool lower temperature, below 30° C., is preferred. Thus, a temperature is selected for the ejection of the fluid which will maintain the DNA's viability for linking to a target DNA. A number of such low temperature printers are known in the art today of which piezoelectric printers are one class and any of those available in the art are acceptable.

Another acceptable technique is to place the fluid into a pipette and drop the fluid onto the substrate 108 to form the individual microdots. Yet another acceptable technique is to use a solid glass rod, without a lumen, and to extract a drop from the fluid using the surface friction between the fluid and the solid glass rod to pick it up and then deposit the microdot onto the substrate 108 at the desired location. Any other of the many acceptable techniques may be used in order to transfer the fluid containing the desired primers from the fluid reservoir to place them in small microdots on the substrate 108.

Figure 4:
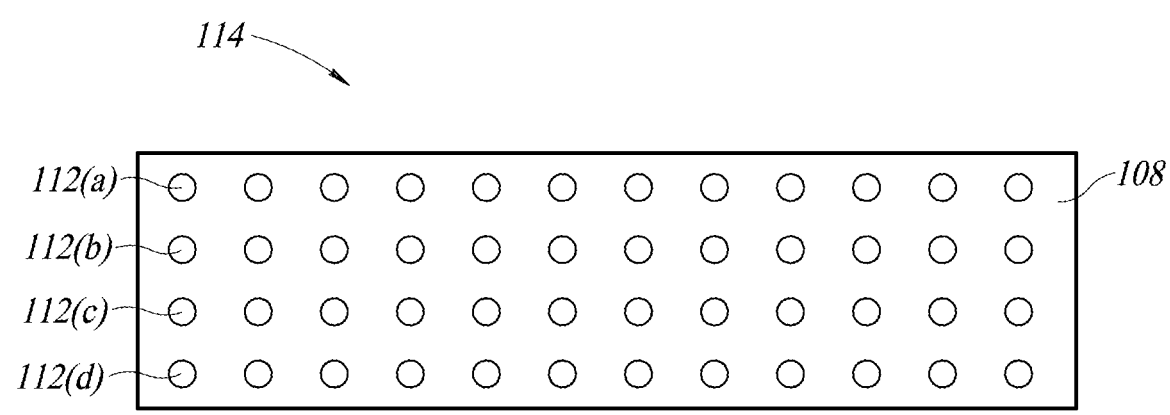
FIG. 4 is a top plan view of an array of microdots according to an embodiment disclosed herein.

As shown in FIG. 4, an array 114 of microdots are placed on the substrate 108. Among the group of microdots 112 are particular microdots that contain specific primer for a selected target pathogen gene (DNA or RNA). In the embodiment shown in FIGS. 4 and 5, each of microdots 112(a), 112(b), 112(c) and 112(d) contain a different pair of primers that will each adhere to different target genes.

Figure 5A:
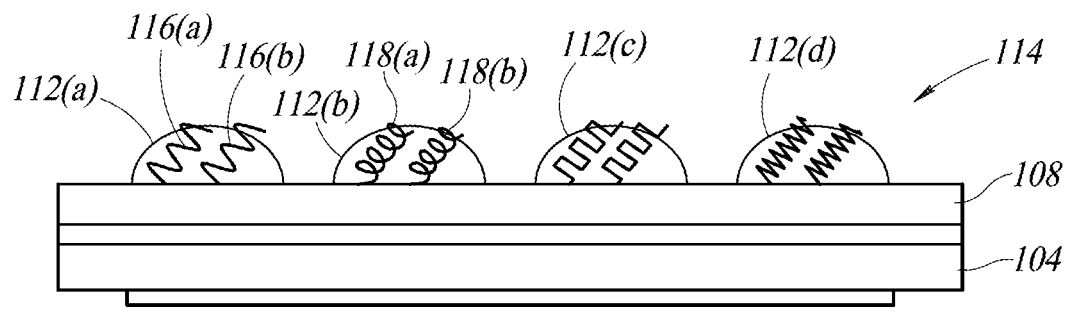
FIG. 5A is an end view of the microdots having view of at least two primers enlarged as fixed therein.

Viewing FIG. 5A, it is shown that specific FW-primer (a) and Rev-primer 116(b) within the microdot 112(a) are custom for specific double stranded DNA genes. If there is DNA in the specific gene within the sample fluid 122 that contains strands that would bond with the particular primers that had been placed in microdot 112(a), it will amplify on primers 116(a) and 116(b). However, there will be no growth in microdots 112(b), 112(c), or 112(d).

Figure 5B:
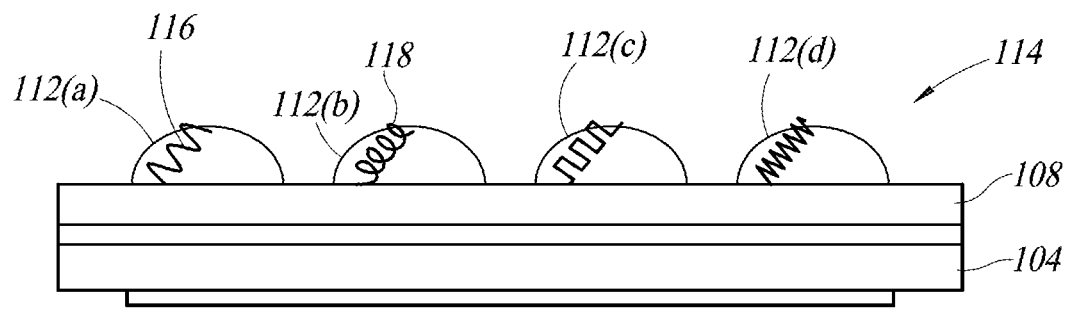
FIG. 5B is an end view of the microdots having only one primer in each microdot.

Similarly in FIG. 5B, it is shown that a single primer 116 within the microdot 112(x) is custom for a specific single stranded RNA gene. If there is the specific gene within the sample fluid 122 of the strand-RNA that would bond with the particular primers that had been placed in microdot 112(a), it will amplify on primers 116, 118 or other single primer placed therein. In one embodiment, a single primer is used for single-strand RNA genome pathogen (SARS COV2). Thus, it is possible to provide the gene amplification using a single primer, a pair of primers, three or more primers or other combination of primers that are available for use at the time the invention is practiced.

Each of the microdots has been selectively provided with a pair of FW-Rev-primers (at various FW/Rev ratios) or a single-primer that will hybridize with each strand of the specific gene. Within the array 114 of the microdots 112, each microdot will hybridize to a different gene target sample. For example, the microdots 112(a) will hybridize to a different type of target gene than microdots 112(b) and microdots 112(c) will hybridize to a different target gene.

As noted, FIG. 5 is a side view of the substrate 108 in which the different types of DNA primers from each microdot 112 are easily viewable. Each of the microdots 112(a), 112(b), 112(c), and 112(d) are illustrated having different DNA primers 116(a) and 116(b) for forward and reverse primers that are specific to that particular microdot. Another microdot will have different forward and reverse primers 118(a) and 118(b) which are shown associated with the microdot 112(b). The primers 116(a) and 116(b) are shown greatly enlarged and extending further from the microdot 112(a) than they are with respect to the scale of the microdots and are enlarged in order to better illustrate the ability to adhere to the gene DNA target.

Figure 6:
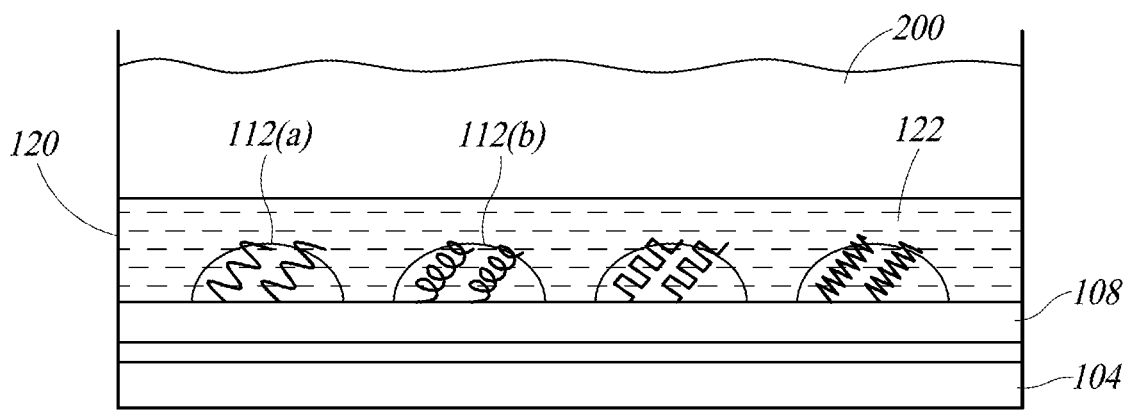
FIG. 6 is an end view of a fluid under test being applied to the microdots.

FIG. 6 shows the next step in which the substrate 108 has been placed in a housing 120. Namely, the substrate 108 can be placed in cartridge that contains various open chambers that can act as the housing 120 hold the substrate 108 in the bottom and receive a sample containing fluid 122. Over the fluid 122 a sealing layer 200 is provided to maintain the integrity of the sample fluid 122. The sealing layer 200 can be mineral oil, wax or other material that is less dense than the sample fluid 122. The substrate 108 can be placed in the housing 120 at a desired time, for example, well prior to introduction of the sample fluid 122. The substrate 108 can be placed in a cartridge that comprises housing 120 right after the microdots are placed thereon, as explained later herein. The substrate 108 is removed from the support 102 when it is placed in the housing 120 since the support used during the manufacturing process is no longer needed. The substrates 104 and 106 can remain with the substrate 108 and be placed in the housing 120 in one embodiment, and can also be separated from the substrate 108 so that only it is placed in the housing 120.

Figure 7:
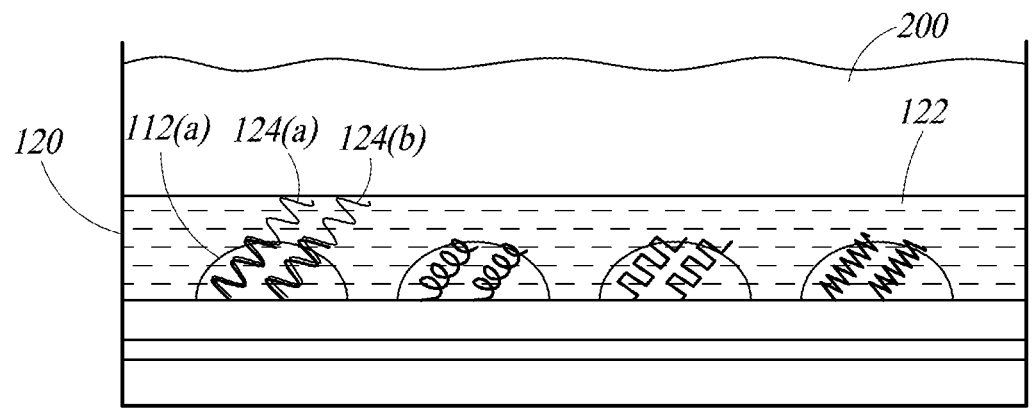
FIG. 7 is an end view showing the gene amplification during the qPCR process.

As shown in FIG. 7, after the sample fluid 122 containing the gene target to be tested in place in the housing 120, a number of RT-qPCR amplification cycles are carried out. The carrying out of RT-qPCR amplification cycles on a fluid containing a gene target to be amplified is well known in the art as described in many publications and the details need not be provided here. In summary, the amplification includes a number of heating and cooling cycles under selected conditions to cause DNA in the fluid 122 to grow and attach to the primers present in the microdots as it grows. According to this disclosure, the primers are fixed in the microdots 112 at a prior time, several days, weeks or months before being exposed to the gene target in the fluid 122. Namely, primers 116(a) and 116(b) that are present in the microdots 112 and have exposed linking sites at the surface of the microdot. The gene target will be not amplified on the other microdots 112(b), 112(c) and 112(d) because the gene target for the primers within those microdots is not present in the fluid 122. The different types of primers are drawn as different shapes, such large zig-zags, curls, square lines, or tight zig-zags for microdots 112(a), 112(b), 112(c) and 112(d) respectively for illustration purposes only to show that they are specific to hybridize with only the gene target for which they are custom fit and not with other genes.

Figure 8:
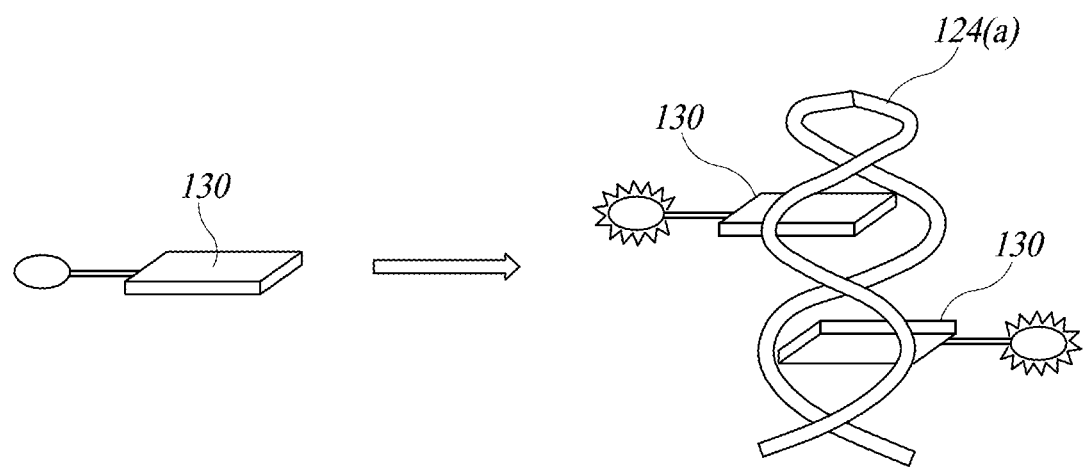
FIG. 8 illustrates how fluorophores are present in a selected gene strand as the amplification occurs.

As shown in FIG. 8, fluorophores 130, as SYBR Green, SYBR Gold, etc., are present in the fluid 122 and enter the double strand amplicon as it grows. In some embodiments, the double strand amplicon can be a gene structure that is a double stand amplification of genetic material. It can be, for example, DNA, RNA, or some other PCR amplified gene material. The fluorophores can be present as intercalating fluorophores in some embodiments. Alternatively, the fluorophores can be present in the double strand amplicon in different structures or modes. They can be present linked to the amplicon by an affinity to part of the structure, by coupling to an available site, or by other techniques. Thus, the fluorophores can become associated with the gene material as it is amplified by any acceptable method, whether by intercalating, coupling to the gene by attaching to available sites on the structure or any acceptable technique. This will provide an optical signal for each of the amplified strands that has been amplified from a respective microdot 112.

As the amplification occurs, an increasing number of fluorophores 130 enter the growing double strand amplicon structure 124(a), increasing the light that will be given off when the microdot is subjected to excitation energy. The fluid 122, together with each of the microdots 112, are subjected to an excitation energy while the amplification process is occurring in order to cause the target DNA to fluoresce if it is present on the microdot. For example, an argon laser, UV light, or other light source can be applied as an excitation energy to the microdots 112 in order to cause the fluorophores present in the target DNA to emit light. As illustrated in FIG. 8, various fluorophores are placed into the amplified DNA structure 124(a) as it grows so that they are present within the double strand amplicon structure. When the microdot 112 is subjected to an excitation signal, such as a laser light, UV light, LED Light or other source, then the fluorophores 130 will fluoresce providing a visible response if the target DNA 124 has grown at the particular microdot.

Figure 9:
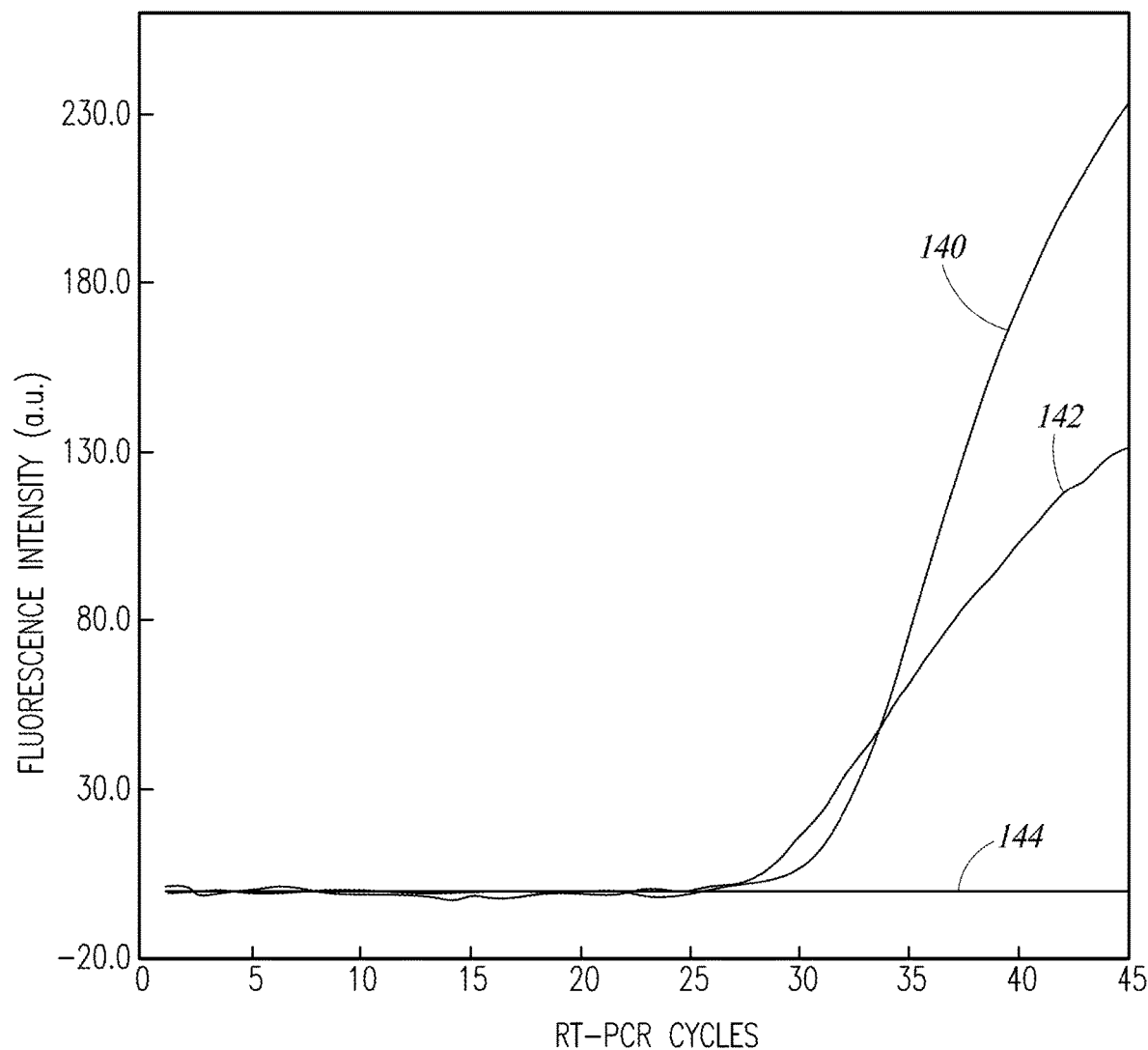
FIG. 9 is graph showing the level of fluorescence detection after a selected number of RT-qPCR amplification cycles.

FIG. 9 is a graph that shows the change in fluorescence intensity as RT-qPCR cycles are carried out on the fluid under test. In particular, FIG. 9 shows the fluorescence intensity output of two microdots, the first line 140 showing the change in fluorescence intensity output for a target probe for the specific pathogen SARS-CoV-2 virus as additional RT-qPCR cycles are carried out. Line 142 shows the increase in fluorescence intensity for a microdot having primers that bond to gene PAN1 virus as RT-qPCR is carried out. In particular, as shown in FIG. 9, while the fluid 122 is present overlying the microdots on the substrate 108, the RT-qPCR cycles are carried out which results in growth and hybridization to those primers which match to the target material present in the sample fluid 122. As illustrated in FIG. 7, microdot 112(a) has gene molecules attached to the primers causing them to grow. As they grow, the number of fluorophores 130 within the amplicons 124(a) will increase in number and the fluorescence intensity will increase. The excitation energy, whether in the form of a laser, UV light, or other excitation energy, is concurrently applied to the liquid 128 and the microdots 112 while the RT-qPCR cycles are being carried out. In the example shown in the graph of FIG. 9, at approximately 30 cycles, the number of fluorophores within the DNA 124(a) have increased to the point that fluorescence intensity begins to be visible. As the cycles continue, the target DNA 124(a) has grown larger so that at approximately 40 cycles the fluorescence intensity has reached to be approximately 200 a.u. for the gene target G1 for the microdot under consideration, line 140. With respect to the microdot that hybridizes to the gene G2, the fluorescence intensity is in the range of approximately 100 after 40 cycles, line 142. Since the excitation energy is applied to the to the sample fluid 122 while the RT-qPCR cycles are carried out, the transition from no fluorescence to a high level of fluorescence can be recognized and sensed. According to one embodiment, each RT-qPCR cycle takes in the range of one minute, though in some embodiments, the RT-qPCR cycles may be several minutes in length for one cycle. In the situation in which a single RT-qPCR cycle takes approximately one minute, this means that after about 30 minutes of the test being conducted, 30 cycles will be completed and the results will be known whether or not the target DNA is present in the sample under test as present in the sample fluid 122.

The present disclosure has the benefit that the excitation energy is applied to the microdot 112 concurrently with the cycles being carried out and while the sample fluid 122 is present covering the microdots. This provides the advantage that as soon as fluorescence begins, this can be sensed and results provided to the user of the test. It also provides the benefit that the amount of gene target present can be approximated based on the number of cycles required for the fluorescence to start and its overall ending intensity. If the fluorescence intensity climbs quickly, to a high value, for example, over 200 a.u., this provides an indication that there is a high amount of the gene target in the sample fluid 122. It also has the benefit that as soon as the target DNA is detected as being present, the test can end rather than continuing for an extended period of time.

Figure 10:
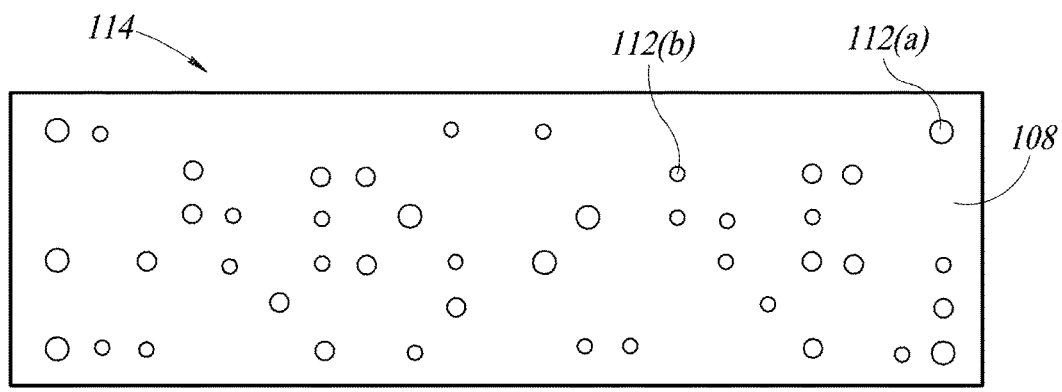
FIG. 10 is a top plan view of fluorescence from a substrate having an array of microdots thereon according to the detected gene in the test fluid.

FIG. 10 is a top side view of the substrate 108 as shown in FIG. 4 after the RT-qPCR cycles have been carried out and illustrating with a circle the microdots 112 which have a high fluorescence intensity. As can be seen viewing FIG. 10, the array 114 of microdots has a number of microdots which are outputting light, the amount of light being output indicated by the size of the diameter of the particular microdots 112. The intensity of fluorescence signal is related to the amount of gene target present that has been amplified in the sample.

This level of fluorescence as shown by FIG. 10 would be similar to that shown in FIG. 9 in which line 140 corresponds to the light output by microdot 112(a) and line 142 corresponds to microdot 112(b). The microdots not illuminated in FIG. 10 are those for which the specific gene target for those particular microdots is not present in the fluid 122 which is being tested. In particular, each microdot 112 as shown in the FIG. 4 is still present on the substrate 108, however, the majority of the microdots 112 did not have the specific gene target for which the primers were selected to hybridize with present in the fluid under test. Accordingly, the gene target of the sample 122 did not attach to those microdots and after a number of RT-qPCR cycles were carried out, the microdots did not output fluorescent light and remained dark as line 144 in picture 9. Therefore, it can be reported that the target DNA for which those particular microdots had been selected to test for was not present in the sample 128.

Figure 11:
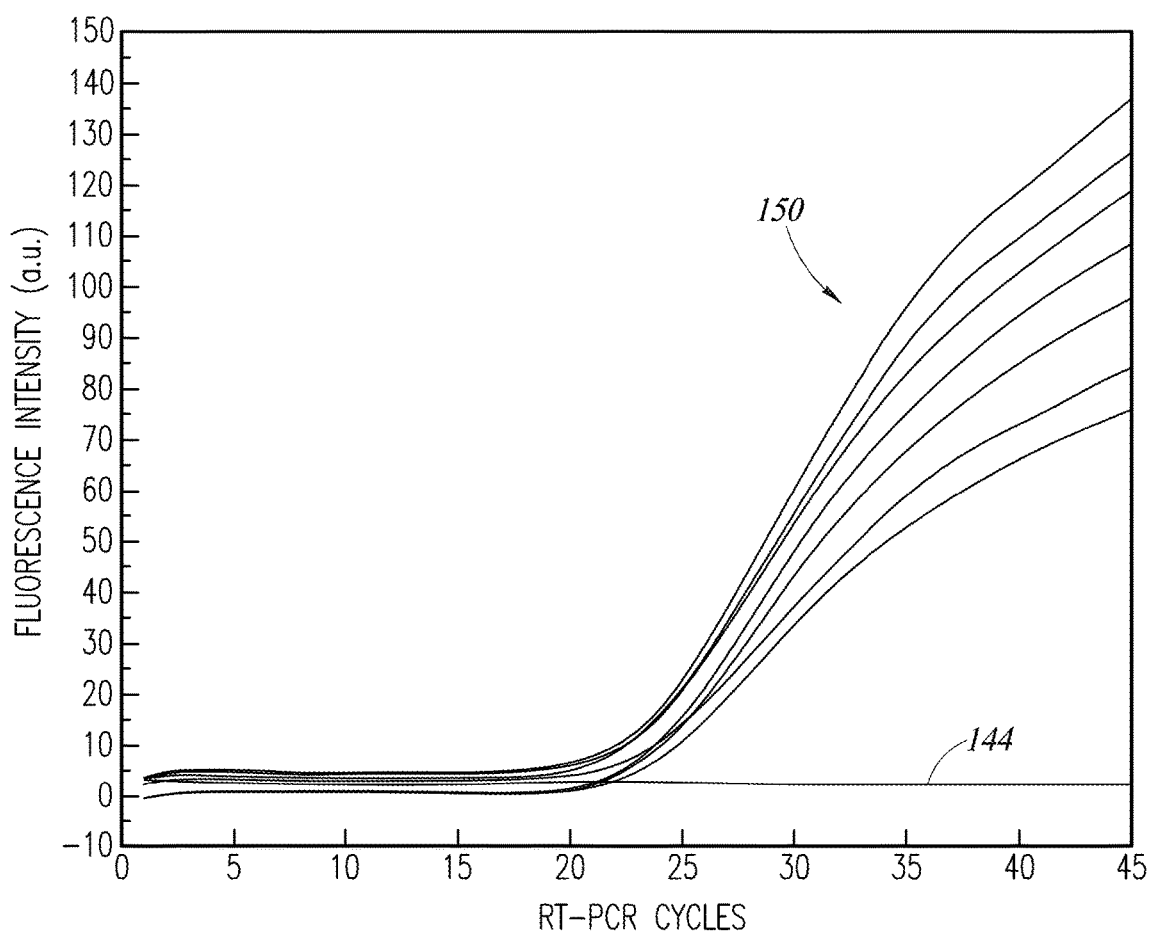
FIG. 11 is a graph showing the fluorescence intensity changing based on the number of RT-qPCR amplification cycles.

FIG. 11 is another example of the fluorescence intensity changing on a substrate 108 as RT-qPCR cycles are carried and excitation energy as applied to the entire array 114 of microdots. In the example of FIG. 11, all microdots 112 are each excited, each one outputting a light signal, the group of light signals labeled generally 150, in which several individual microdots are outputting fluorescent light because the target DNA for many microdots 112 is present in the sample under test. The flat line 144 indicates that no light is being emitted by those microdots for which the gene target is not present. Accordingly, even after more than 40 cycles, the microdots 112 for which the gene target is not present for which their primers have been selected to hybridize with still remain dark, indicating that the target gene for those microdots is not present in this sample under test. According to a preferred embodiment, each substrate 108 will contain a plurality, usually in excess of a dozen microdots, many containing the same primers for hybridizing with the same target DNA. Accordingly, if the target gene is present it would be expected that all of the microdots that have the same primers that will hybridize with the particular DNA under test will increase in fluorescence intensity at about the same time, thus providing duplicative testing sites and a higher degree of assurance regarding the validity of the test, whether a positive or a negative for the DNA under test.

Figure 12:
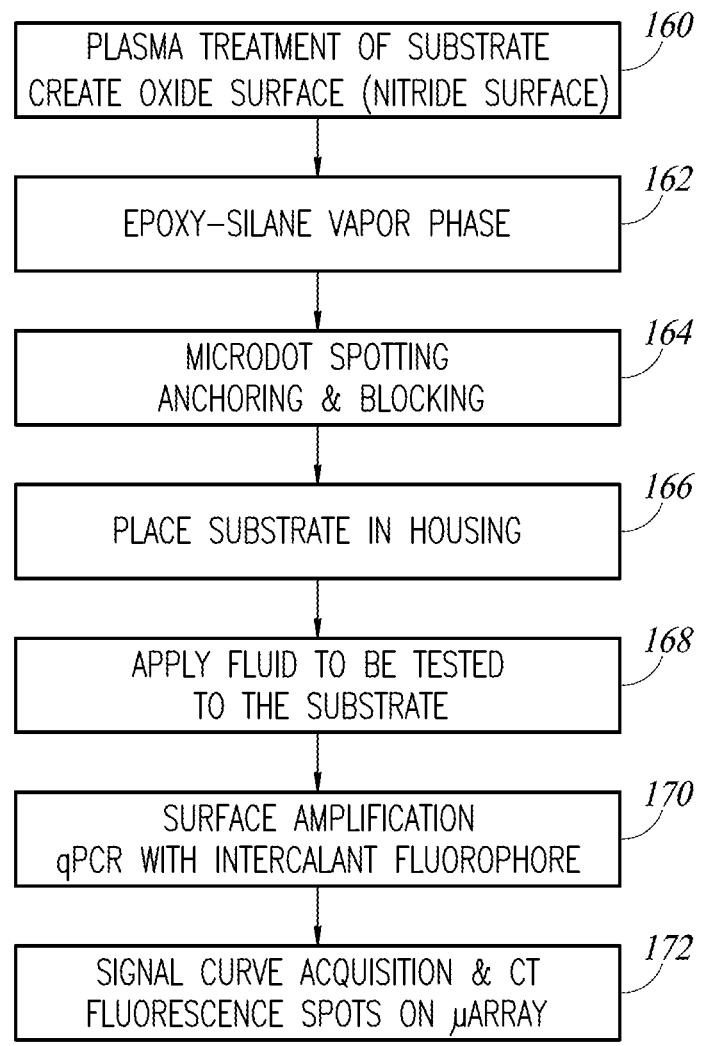
FIG. 12 is a flow chart of a method of carrying out gene amplification on the described microarray according to this disclosure.

FIG. 12 illustrates one flowchart according to a particular method to carry out the process of constructing and using a substrate 108 according to the principles of the present disclosure. In a first step 160, a substrate has the surface treated with a silicon oxide plasma, or alternatively, the substrate 108 is subjected to a plasma in the presence of oxygen gas, therefore creating an active silicon oxide upper surface. According to an alternative embodiment, the plasma may be carried out in the presence of a nitrogen gas, thus creating a nitride surface, for example, a silicon nitride upper surface. Depending on the material for the microdots, either a silicon oxide or a silicon nitride surface is preferred, other substrates can be used, such as glass, plastic, polymers etc. According to the next step, a vapor phase deposition is carried out. According to one embodiment, epoxy-silane is formed using a vapor phase silanization process in order to provide a strong adherence of material to the upper substrate 108, as illustrated in step 162. After the creation of an adhesive later, whether by the vapor phase deposition of an epoxy-silane material or other adhesion layer, the microdots having the primers (pairs at various molar ratios or a single primer) are placed on the substrate 108 in step 164. The microdots 112 are anchored to the substrate 108, and then the appropriate annealing is carried out in order to stabilize the microdots 112 on the substrate 108. Once stabilized, the primers in the microdots remain active for potential bonding at a later time that might be several weeks or months away. After step 164, the substrate 108, having a microdot array 114 thereon comprised of a number of microdots 112, can be placed in storage for a long period of time, several months, or perhaps several years. When desired, the substrate 108 can then be sent to a number of different locations, such as hospitals, laboratories, testing sites, or even in the field at various doctors' offices, or drive-by health clinics. The substrate 108 has been properly stabilized so that the microdots 112 remain vital and available for DNA amplification when they are subjected to a test sample. The various microdots may remain stable for several months, using the appropriate sealing and annealing techniques as is known in the art.

At this stage in the process, the substrate 108 in the cartridge that contains housing 120 will be in the hands of many healthcare professionals at numerous locations awaiting use for samples under test. At some period of time, after step 164, the substrates 108 will be placed in a proper housing, such as a cassette, a clip, or some type of receiving surface that contains a housing 120 so that it can receive a fluid sample 122. The substrates 108 can be placed in the housing 120 prior to being shipped to the various medical testing labs, or can be shipped as substantially flat substrates 108 and can be placed in the housing 120 just prior to the test being carried out. As shown in step 166, the substrates are placed in a housing 120 that has a place for a reservoir at some point after being properly manufactured and stabilized.

In step 168, a fluid to be tested is applied to the substrate 108 while in the housing 120. The step 168 can be carried out at any time in the future, depending on when the samples are collected and it is desired to conduct a test. After the fluid under test, in the example shown, fluid 122, has been applied to the substrate 108, then surface amplification takes place using qPCR with intercalating fluorophores as shown in step 170. In one embodiment (specific for DNA gene pathogen) the particular PCR process that is carried out is Amplification using Surface Real Time qPCR. The surface amplification provides the amplification of the DNA gene present in the fluid 122 to attach to the surface of the particular microdot having a pair of primers that matches the target gene, but not to any other microdots.

In a second embodiment (specific for single and double stranded RNA gene pathogens) a reverse transcriptase reaction needs to be performed, before beginning the Surface Real Time qPCR.

If the gene under test contains the specific sequences that match with the primers of a particular microdot 112, then the number of fluorophores 130 will increase as the amplification reaction DNA chain connected to the respective microdot becomes longer. As the amplification cycles are carried out, concurrently an excitation energy is applied to the microdots 112 as shown in step 170. In particular, as illustrated in step 172, the excitation energy is applied to the microdots as the RT-qPCR cycles are being conducted, and the microdots which have primers that match with the target DNA present in the sample under test 122 will begin to increase in the light intensity output, as illustrated in FIGS. 9 and 11. In particular, step 172 shows the RT-qPCR cycles being carried out while there is sensing of an increase of the output of fluorescent light in the sample under test. The number of RT-qPCR cycles carried out can vary depending on the target DNA and the type of fluid being used. In some embodiments, the number of RT-qPCR cycles may be in the range of 30 to 40, while in other embodiments, the number of RT-qPCR cycles may exceed a few hundred, again depending on the type of DNA being tested for, the material of the microdots, and the fluid 122 being tested.

In a third embodiment (for a single and double stranded RNA gene pathogen) a direct surface reverse transcriptase is carried out. In this case the ssRNA gene is recognized by a single primer on microdots and the surface reverse transcriptase is carried out. Similarly, the dsRNA gene is recognized by the pair of specific primer and then the surface reverse transcriptase is carried out.

Figure 13:
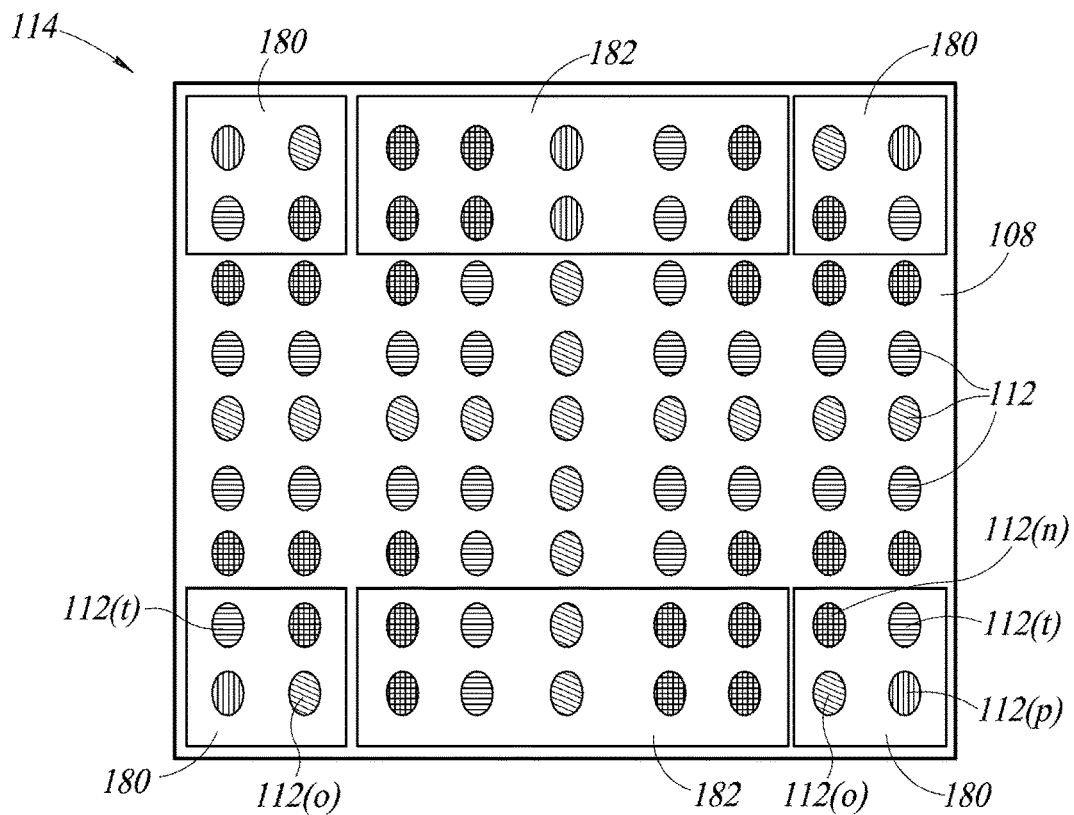
FIG. 13 is a test pattern of an array of microdots having different gene primers therein.

FIG. 13 illustrates a substrate 108 having thereon an array 114 of microdots 112. In the example of FIG. 13, the array 114 has been specifically constructed in order to facilitate and improve the sensing of a particular target DNA. The type of hatching in each microdot of FIG. 13 indicates the purpose of the microdot, with hatching for a positive test, negative or other.

In the example of FIG. 13, the substrate 108 contains four alignment sets 180 of microdots that are in each of the corner of the substrate 108. In particular, alignment sets 180 are positioned in each of the corners of the substrate 108. These alignment sets 180 contain two different types of primers in the respective microdots 112. In particular, the alignment arrays 180 will include a microdot 112($p$) which is a RT-PCR control positive and microdot 112($n$) which is a RT-PCR control negative. In this particular example, microdot 112($p$) is always positive and shows fluorescence output, thus, microdot 112($p$) will output light in all circumstances; if microdot 112($p$) is dark, then the substrate 108 is discarded as not valid because this is an indication that a global error has occurred, either in the test or in the construction of the completed substrate 108. The positive microdots 112($p$) also assist with alignment during the test, particularly if all the other dots are dark. Thus, the positive microdots will act as alignment markers when the sensing is being carried out to ensure that the substrate and cartridge are properly positioned in the testing apparatus.

The rest of the array is composed by various microdots 112($t$) with target primers specific for pathogen genes (such as hepatitis, SARS-CoV-2) and microdots 112($vt$) for variants recognition. The microdots 112($t$) and 112($vt$) will fluoresce if the pathogen or its variants are found to be present in the sample, but will remain dark and not fluoresce if the specific target gene is not present in the sample. Microdots 112($vt$), 112($vo$) 112($vn$) may also be present on the substrate 108, but are not shown in FIG. 13 for simplicity.

Microdot 112($n$) has primers that will not react with the target gene to which microdot 112($t$) is positive. Namely, microdot 112($n$) contains an opposite type of primers that will prevent growth of the type of gene which microdot 112($t$) is testing for and seeking for the target. Accordingly, microdot 112($n$) will remain dark and show a negative test at all times if the test is a valid test. If microdot 112(*n*) emits light the test is considered invalid. Microdot 112(*o*) is provided to test for additional types of pathogen genes, which might be present in the sample and related microdots 112(*vo*) for variants of the additional types of genes being tested for will also be present in the microarray.

For example, it is known that it is common for other pathogen microorganisms such as PAN1 or PAN2 to be present in the same environment in which gene virus such as SARS-CoV-2 is present. Accordingly, the presence or absence of another gene, which is distinctly different from the target under test, but often found with it, is also beneficial to provide an indication whether or not the test is a true positive test or a false positive test, or on the other hand, is a true negative test or a false negative test. In one embodiment, a set of orientation microdots 182 are at the top and bottom of the substrate 108. The orientation microdots 182 are provided at a preset location where the specific alignment and makeup of the microdots at the edges of the substrate 108 are known. As can be appreciated, in some embodiments, the substrate 108 will have only one or two alignment sets 180 of the microdots and may or may not have orientation sets 182 of the microdots. Alternatively, the substrate 108 may have multiple alignment sets at various locations throughout the array instead of only at the corners.

Viewing FIG. 13, it can be seen that throughout the entire array 114 there are a variety of different microdots having different primers therein (designed to recognize the pathogen and its variants) that are prepared in advance to hybridize with different target DNAs that may or may not be present in the fluid 122 under test.

Figure 14:
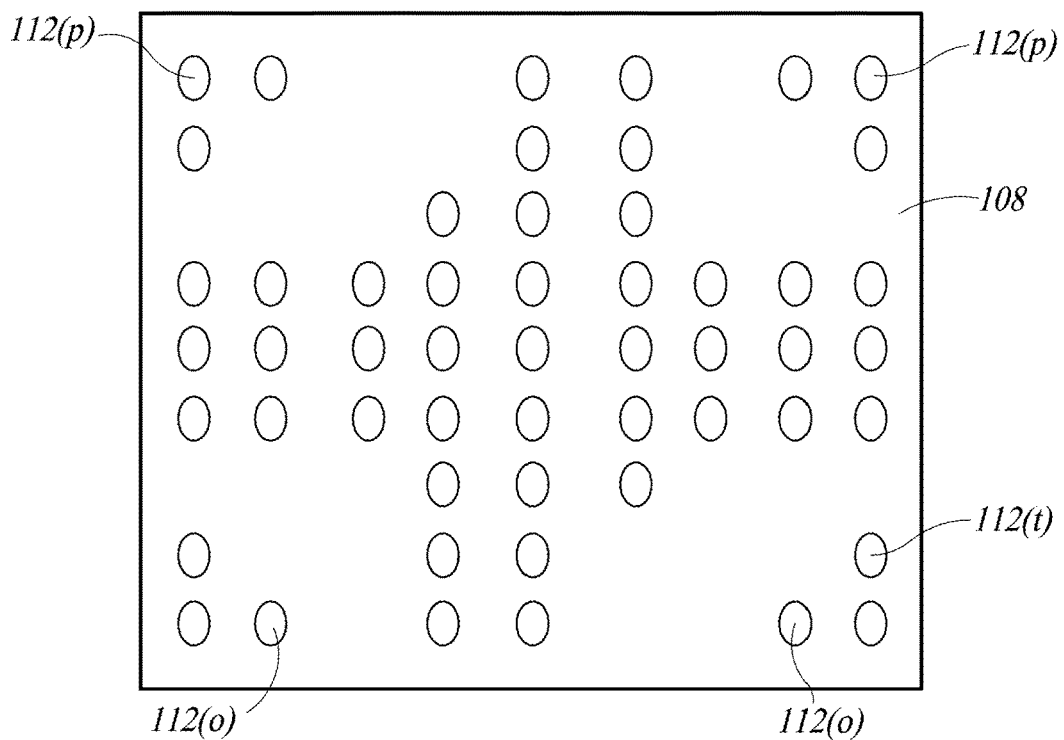
FIG. 14 shows the results of repeated amplification cycles being carried out on a substrate prepared according to the present disclosure.

FIG. 14 illustrates the results of a test being carried out on the substrate 108 of FIG. 13 in which a positive sample of SARS-CoV-2 is present in the fluid 122 and amplification cycles in excess of 30 have been carried out. As can be seen in FIG. 14, each of the control microdots 112(*p*) are illuminated, indicating that the test has been properly carried out with respect to amplification. It would be expected that each of the control positive microdots 112(*p*) would be illuminated in the instance of the target DNA not being present. Accordingly, the illumination of microdots 112(*p*) indicates that the amplification has properly occurred and that the sample has been properly tested in order to determine whether or not the target DNA is present. It can also be seen in this particular instance that the microdots 112(*t*) that contain the primers for the target gene, which for this example is SARS-CoV-2, are also illuminated. This indicates that each of the microdots 112(*t*) has hybridized and grown the target gene corresponding to pathogen species being present.

Similarly, in the particular sample under test, PAN1 was shown as present in the other sample being tested, as indicated by the microdots 112(*o*) also being illuminated.

As can be seen in FIG. 14 each location in which a negative microdot 112(*n*) is present, no light is output and the substrate 108 is dark at that location, as shown in FIG. 14. This illustrates that the test has been properly carried out with respect to the microdots 112(*n*) continuing to show a negative value and not turning to positive through the amplification cycles.

Figure 15:
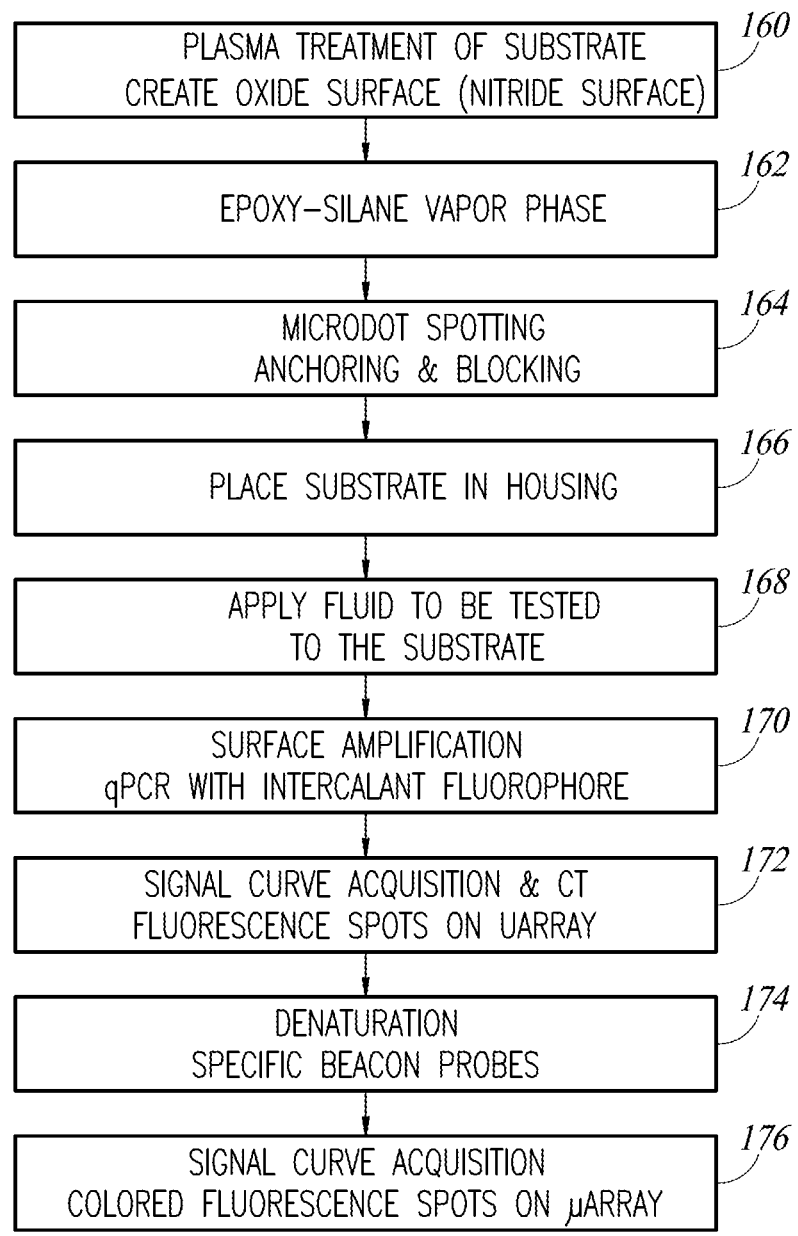
FIG. 15 is a flow chart of the process for carrying out sample testing according to the methods of the present disclosure.

FIG. 15 illustrates a further embodiment and additional steps being carried out on the substrate 108 and the sample under test of the fluid 122 containing the target gene. As illustrated in FIG. 15, each of the initial steps is the same as FIG. 12, namely the surface is prepared in step 160 in which a plasma treatment of either oxygen or nitrogen is carried out. After this, the surface has an adhesion layer applied, for example, with an epoxy-silane vapor phase deposition in step 162 which is followed by applying the microdots 112 having the primers contained therein after which the primers are properly stabilized. In step 166 the substrate 108 is placed in a housing, and then in step 168, the fluid is then applied to be tested. Surface amplification is conducted as previously described in step 170 and then the signal acquisition is carried out in step 172.

If the test indicates that the target gene is present in step 172, then it is possible to carry out a further test of the target gene under consideration. Specifically, in the further embodiment of additional testing, after the target gene has been fully hybridized and a large strand of DNA of the target material has attached to the microdot 112(*t*) and 112(*vt*), then further testing can be carried on that particular target gene strand.

According to the embodiment of FIG. 15, the fluid 122 under test is washed away and removed from the substrate 108. The target gene strands 124(*a*) and 124(*b*) remain coupled to the respective microdots. As previously indicated, the fluid 122 under test was present during the entire amplification process and also present during the application of excitation energy to the microdots in order to cause them to fluoresce in the presence of the fluorophores being absorbed into the target gene being built during the amplification process. In some instances, the mutation vt of the target gene might not be sufficiently close to the target gene to cause a reaction on either microdots 112(*t*) or 112(*vt*). It is preferred in some embodiments to insert specific primers at different locations or in different microdots 112 in order to sense for yet unrecognized variations of the target gene t for which microdots 112(*t*) and 112(*vt*) have been tuned. After the test results show positive, the fluid 122 is removed and the microdot array 114 is subjected to a new fluid which denatures at least one of the primer, whether forward or reverse of the microdots that contain the grown gene material 124. In particular, during the denaturation process, as is known, some of the grown gene 124 will be separated and the different strands of DNA 124(*b*) will be removed from the microdots in order to free up the exposed ends of the various primers and different portions of the DNA 124 which has been hybridized and grown during the amplification process. After this, in step 174, a pair of specific beacon probes (properly designed to recognized the specific mutation and wild-type) labelled with different colors (i.e., Cy5 and Cy3) are introduced into the fluid.

In one particular example, the SARS-CoV-2 virus has a number of variants that may exist, some of which are known as the UK variant, the Brazil variant, or additional mutations or variants that may occur over time. After a determination of a positive SARS-CoV-2 test has been conducted, it may afterward be desirable to determine the particular mutation or variant of the type of SARS-CoV-2 virus present that has been tested. The microdots 112(*t*) of the primer in the first test are prepared to show a positive result with any type of variant of the SARS-CoV-2 virus present. Therefore, the microdots 112(*vt*) that include the sequence region of mutation will be interrogated by the pair of beacon probes. In step 174, further testing is carried out with specific beacon probes having a specific DNA attached thereto which will bond only to the target DNA for specific variants. The specific beacon probes each have a different color to fluoresce under excitation. If the particular variant of the beacon probe is present in the sample, it will bond to where some strands of the gene mutation were or remain present. Accordingly, once the beacon probes are introduced, the beacons will hybridize with the extended gene or DNA strand, giving a fluorescence signal. The signal ratio Cy5-mut/Cy3-wt will indicate the presence/absence of mutation.

Figure 16:
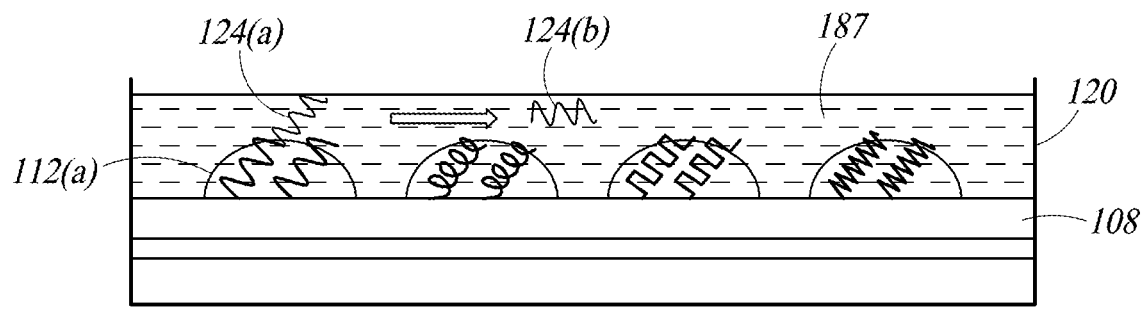
FIG. 16 illustrates a further embodiment of the present disclosure.

FIG. 16 illustrates the carrying out of steps 174 and 176 of the flowchart of FIG. 15. In particular, a new fluid 187 is introduced into the housing 120 after the fluid under test 122 has been removed and the substrate 108 has been properly washed and annealed and treated in preparation for the next step. The fluid 187 includes a number of specific beacon probes of different mutation, each of which will adhere to particular variants of the target gene under test. The fluid 187 will carry out a denature process in which some of the hybridized DNA 124(b) and/or some of the hybridized DNA 124(a) is removed from the microdot (see FIG. 7 in which the DNAs 124(a) and 124(b) have grown onto the microdot 112(a)). In particular, some or all of the hybridized DNA 124(a) and 124(b) will be removed from the microdot 112(a), or in the example of FIG. 13, microdot 112(t) for the microdot for the target material. After the microdots 112(t) are hybridized and then denatured, this leaves open sites on the microdot 112(a) that are receptive to particular types of beacon probes for the variant to be tested.

Figure 17:
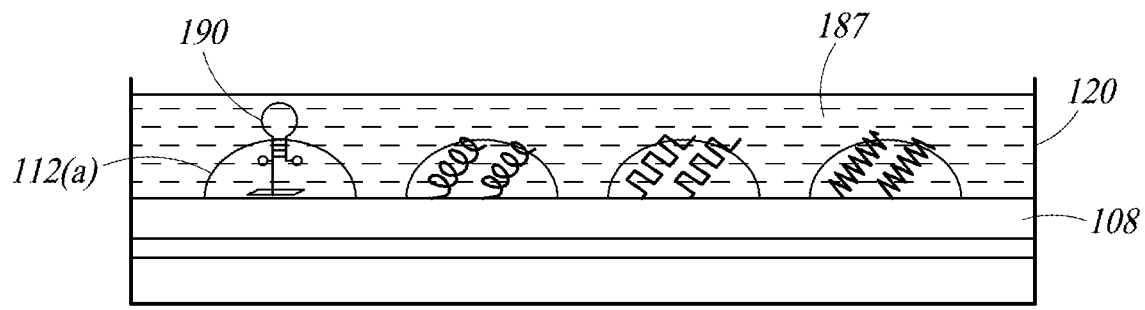
FIG. 17 illustrates an additional step in the embodiment of FIG. 16 in which a specific beacon probe is provided at selected locations in the microdot array.

As shown in FIG. 17, at this stage, a plurality of beacon probes, that correspond to the different variants (and its related wild-type) of the virus under test, are present in the fluid 187. The beacon probes Cy5-mut-190 will attach to the microdot 112(a) in the event the particular variant under test corresponds to the type of microdot being sensed by the beacon probe 189.

Thus, within the fluid 187 will be a number of different beacon probes to test for different variants of the target gene. Those beacon probes which correspond to the variants that have been found will attach to and begin to fluoresce the signal of Cy5, but some of Cy3-wt-190 will hybridize and the signal Cy3 will be also recorded. Then the presence/absence of mutation will be declared by the Cy5/Cy3 signal ratio.

FIGS. 18-27 illustrates one embodiment in which the microdot array as shown and described with respect to FIGS. 1-7 can be constructed within a cartridge and prepared for use in the field.

Figure 18:
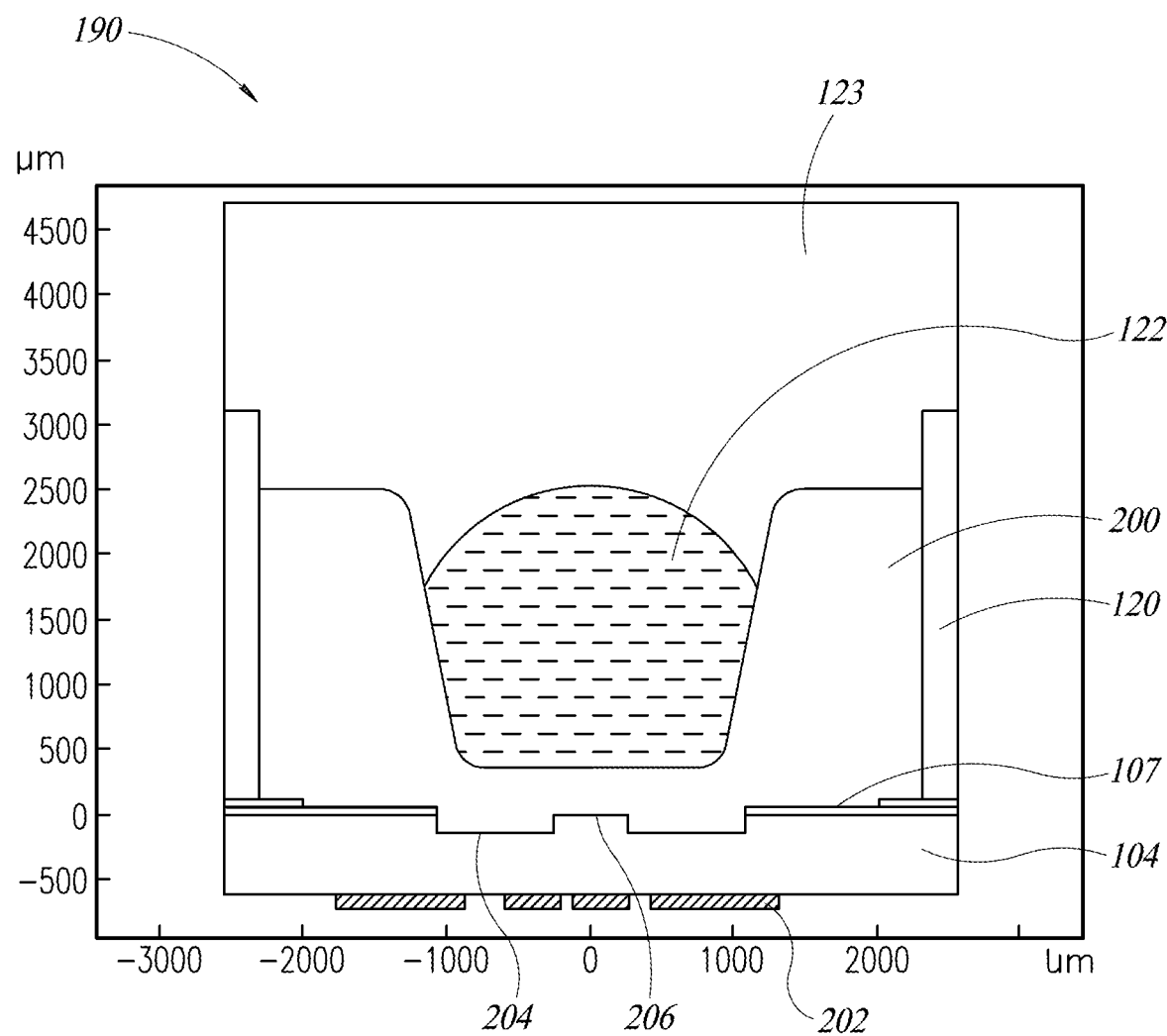
FIG. 18 is a side elevation view of a sample fluid on a substrate prior to starting the PCR cycles according to one embodiment of the disclosure herein.

FIG. 18 shows a chamber 190 which contains a sample fluid 122 according to the principles as described herein. The sample fluid 122 can correspond to the sample fluid 122 shown in FIGS. 6 and 7, or a different prepared sample fluid, according to any method acceptable in the art. In the embodiment shown, the sample fluid is positioned on top of a sealing layer 200 which has been previously prepared to receive the sample 122, as will be described herein. Above the sealing layer 200 and the sample fluid 122 may be any ambient environment, for example, open air, a nitrogen chamber, an inert argon atmosphere, or a sterile environment which permits the introduction of the sample fluid 122 into the chamber 190.

The chamber 190 also includes a substrate 104. According to one embodiment, the substrate 104 is the same substrate that was prepared for use and accessed as explained in FIGS. 1-3. It may also be a different type of substrate, depending on the type of sealing layer 200, or the type of housing 120 that will be used. According to one embodiment, the substrate 104 is a silicon substrate. It can have prepared thereon the layers 106 and 108 as previously described herein and be configured to receive the various microdots 112 as described and shown in FIGS. 4-5B. In this embodiment, the substrate 104 includes a circular recess 204. In the center of the circular recess is a ridge 206. Accordingly, the recess tool is in the form of a donut, with the ridge 206 extending up through the hole of what can be considered the donut shape.

The ridge 204 can have other shapes besides circular, for example, rectangular, oblong, diamond or other embodiments. A pattern which has recesses in a closed loop around a center ridge 206 is preferred. Under the substrate 104 is a heater 202. A layer 107 overlies the substrate 104 outside of the recess and the ridge 206.

The sealing layer 200 has a recess in the sealing layer overlying the substrate. This recess is located in a central region of the sealing layer. The sealing layer has a first height in the central region and a second, greater height in a peripheral region of the sealing layer. A recess 204 is positioned in the upper surface of the substrate, the recess being positioned below the recess in the sealing layer. The recess in the sealing layer is overlying at least a portion of the recess in the substrate. The ridge 206 in the upper surface of the substrate is positioned adjacent to the recess in the upper surface of the substrate and the recess in the sealing layer is overlying the ridge 206 in the substrate. The upper surface of the ridge 206 is in the same plane as an upper surface of the substrate at locations outside of the recess in the substrate, which includes locations positioned below the region of the sealing layer having the second, greater height.

Also shown in the embodiment of FIG. 18, one example of the relative dimensions of the chamber 190 is provided. According to one embodiment, the recess is in the range of 50 μm to 250 μm deep, with a depth of 75-250 μm preferred. The ridge therefore has a height in the range of 52-250 μm, and preferably 150 μm above the bottom of the recess tool. On the left-hand side of the graph in FIG. 18 are the relative micron dimensions of one example embodiment, with the zero height being aligned exactly with the top of the ridge 206. Accordingly, as can be seen, the total thickness of substrate 104 is somewhat greater than 500 μm, for example, in the range of 600-700 μm. As can be appreciated, in some embodiments the thickness of the substrate 104 can be in the range of 400-3000 μm, with a thickness of approximately 600 μm preferred.

Figure 19:
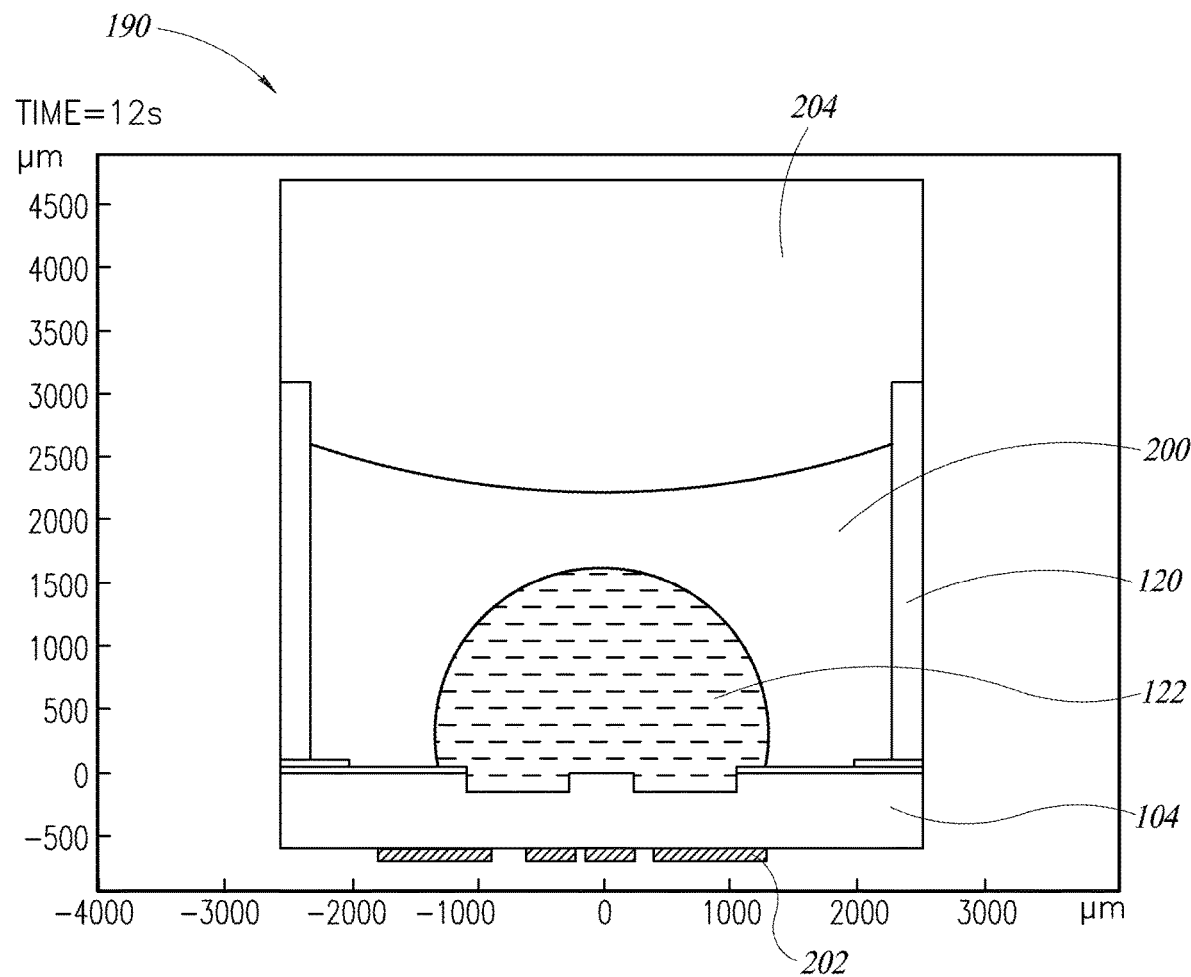
FIG. 19 is a side elevation view of FIG. 18 after the PCR cycles are completed.

FIG. 19 illustrates a subsequent time after the substrate 104 has been heated, which has caused the sealing fluid 200 to modify its shape and the sample fluid 122 has moved to be in physical contact with the substrate 104. In this position, the sample 122 has been heated to an initial temperature, and is prepared to undergo a number of PCR cycles in order to detect the presence of a desired target gene within the sample fluid 122. In the embodiment shown in FIG. 19, a sample time of 12 seconds has passed from when the heater 202 heated the chamber 190 and caused the sample fluid 122 to descend to be in physical contact with the substrate 104. Overlying the substrate 104 will be a large number of microdots 112 as previously described with respect to FIGS. 1-10. These microdots can be physically formed on the substrate 104, as described with respect to FIGS. 1-5B with the various layers 106 and 108 overlying the substrate 104 in the manner previously described. Therefore, in one embodiment, the microdots 112 are formed by placing them onto the properly prepared substrate 104 with the intervening layers. The microdots may therefore be both in the recess 204 and on top of the ridge 206. These are not shown in FIGS. 18 and 19 for simplicity's sake. It will be appreciated, however, that a plurality of microdots 112 can be in the recess tool as well as a plurality of microdots on top of the ridge 206.

In an alternative embodiment, the microdots 112 may be formed on a thin substrate which is fitted and positioned to sit on top of the substrate 104. In this alternative embodiment, a custom prepared substrate is provided, on which the microdots 112 are positioned. This custom substrate is then placed on top of the substrate 104 and properly positioned in the recess and, in some instances, on top of the ridge 206 having the microdots positioned to be physically in contact with the sample fluid 122. As previously noted, for simplicity of illustration, the microdots 112 are not shown in FIGS. 18 and 19.

The method of making the chamber 190 will now be described with respect to this particular embodiment. FIG. 20A shows a starting sequence for the formation of the chamber 190 according to a particular embodiment. The substrate 104 is provided overlying on which a buffer layer 107 is formed. The buffer layer 107 may be an oxide layer that is grown on the silicon substrate 104 using a thermal process in an oxygen environment. It may also be a deposited nitride layer, a deposited oxynitride layer, with alternating layers, a silicon carbide layer or other layer 107 which properly buffers the substrate 104 and prepares it to receive other structures. A metal heating layer is then deposited onto the buffer layer 107, in order to form the heater 202. In a preferred embodiment, the metal layer is aluminum, although in other embodiments it may be comprised of titanium, nickel, copper, or other acceptable material in order to perform the heating function of the PCR process to be later carried out. The deposited metal is patterned and etched to provide a heater and also the sensor definition. As will be appreciated, the method of forming a heater as well as an appropriate thermal center to determine the temperature of the heater and the silicon substrate 104 is known in the art and therefore the details of which are not described herein.

As shown in FIG. 20B, the substrate 104 is flipped over, to place the heater 202 on the bottom and present a top surface having the layer 107 exposed to receive additional process steps. A mask 210 is patterned and etched onto the buffer layer 107 overlying the substrate 104. The mask 210 has a pattern formed therein of the desired shape of the recess tool and the ridge 206. In the embodiment shown, as can be seen in FIG. 20C, the recess tool will be in a circular shape, with the ridge 206 in a circular shape, accordingly a recess forming mask 210 is formed having that shape. With the mask 210 in place, an anisotropic etching takes place in order to form the recess tool, and leave the ridge 206. The etching carried out is selective to etch silicon of substrate 104 and to not etch the buffer layer 107. As can be appreciated, prior to carrying out the etching of the silicon, a selective etch is used to etch layer 107 as shown in FIG. 20B followed by the anisotropic etch of the silicon 104 in order to create the recess tool and leaving the ridge 206 as shown in FIG. 20D. FIG. 20E shows a top side view of the substrate 104 in which the buffer layer 107 can be seen on the top, the recess tool for is a circular recess and the ridge 206 in the central portion thereof.

This etching can be carried out with the dry silica and anisotropic edge to a depth of about 150 µm according to a preferred embodiment. As previously described, the depth of the etch may be in the range of 50 µm-250 or 300 µm the depth being selected based on the microdots 112 to be placed therein. The microdots 112 may have different heights, depending upon the primers 116 to be placed therein. Accordingly, the depth of the recess tool for may take into account the diameter and height of the microdots 112 to be placed therein. In addition, if the recess tool is going to receive an additional substrate to be placed therein it may be etched deeper in order to account for the height of additional substrate which includes the microdots 112 placed thereon.

As seen in FIG. 21A, after the recess tool has been etched, the buffer layer 107 is restored across the entire top of the substrate 104. In the embodiment in which the substrate 107 is a thermal oxide, this can be achieved by heating the substrate 104 in an oxygen-containing atmosphere to thermally grow an oxide layer uniformly on the exposed surface of the substrate 104 to achieve the buffer layer 107. Alternatively, a nitrogen layer, carbide layer or additional buffer layer can be deposited on top of the wafer 104. This can be done with the previous layer 107 in place and add additional thickness to those portions where the layer 107 is already present, and provide a layer which is somewhat thinner in the recess tool for which it has been provided. Alternatively, the entire buffer layer 107 can be removed and an entirely new buffer layer 107 can be provided. According to one embodiment, the buffer layer 107 is 0.5 µm thick and is provided by a CVD deposition of the PETEOS layer.

As shown in FIG. 21B, an isolation layer 212 is provided over the buffer layer 107. The isolation layer 212 can be any acceptable photoresist, in one preferred embodiment, it is an SINR dry film layer of approximate 50 µm in thickness. Any other acceptable photoresist or other polymer layer may be used for the isolation layer 212. As shown in FIG. 1C, the isolation layer 212 covers all portions of the substrate 104 except the recess 204 and the ridge 206. The buffer layer 107 remains on these locations in order to provide a mask stop for the etching of layer 212. Namely, the material selected for layer 212 will be selectively etchable with respect to the buffer layer 107, and therefore, the isolation layer 212 can be pattern etched to have a desired shape with the buffer layer 107 acting as an etch stop.

Figure 23:
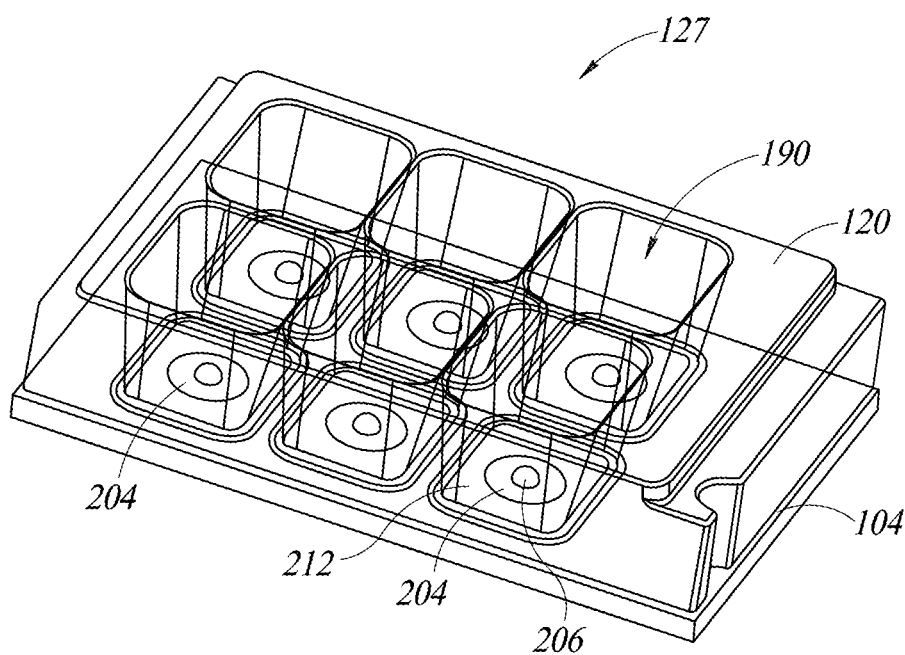
FIG. 23 is an isometric view of a cartridge having a plurality of sampling chambers according to one embodiment as disclosed herein.

As shown in FIG. 21D, housing 120 is then constructed onto the substrate 104. The housing 120 can be a cartridge of the type shown in FIG. 23 and described later herein. In this embodiment, the substrate has a size in which 6, 10, 12 or more recess and ridge combinations are formed therein. Namely, a relatively large substrate 104 is provided in which a plurality of recesses 204 and ridges 206 are formed at the same time during the same preparation process. After this, the housing 120 is placed on top of the substrate 104 in order to provide a plurality of chambers 190 as shown in FIG. 23. Alternatively, the housing 120 can be an individual housing that is custom for only a single ridge 206 and is prepared to receive just a single sample. The housing 120 is coupled by an adhesive 214, which may be a polycarbonate glue, or other acceptable adhesive. In a preferred embodiment, a substrate 104 having a plurality of recesses 204 formed therein is glued by an adhesive to a large housing 120 which has the appropriate chambers which will be aligned with the recesses 204 in order to form a cartridge that can receive multiple samples at the same time.

In one embodiment, the housing 120 is a polycarbonate member which is been previously formed in a different process using techniques well known in the art. An adhesive which is acceptable for gluing a silicon substrate 104 to polycarbonate can be used. In one embodiment, the adhesive has a high adherence to the buffer layer 107 and therefore the housing 120 is attached directly to the buffer layer 107. In alternative embodiments, additional preparation layers may be provided in order to properly affix the housing 120 to the substrate 104 in order to create the cartridge as shown in FIG. 23.

Figure 22:
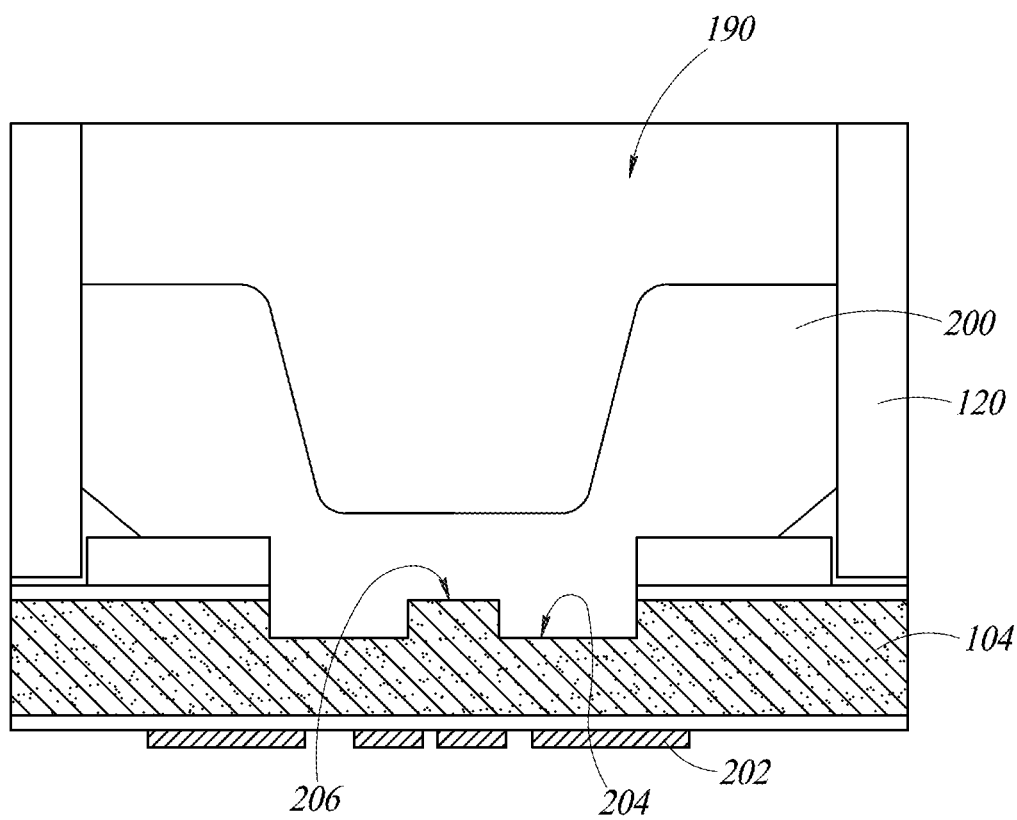
FIG. 22 is a side view of a completed sampling chamber in preparation for receiving sampling fluid according to one embodiment as described herein.

The final chamber 190 is shown in FIG. 22 prior to receiving the sealing material 200. In one embodiment, the layer 107 has been etched away from the substrate 104 in order to leave the silicon as the exposed surface to receive, at a later time, the sample fluid 122 as shown and described with respect to FIGS. 6, 18 and 19. In one embodiment, the layer 107 is removed just prior to the housing 120 being affixed to the substrate 104. In other embodiments, the layer 107 is not etched away and remains present, while in another embodiment, a portion of layer 107 is etched away to leave the silicon with the native oxide on the exposed surface. The uppermost surface of substrate 104 can also be prepared as shown and described with respect to FIGS. 1 and 2 in order to receive the microdots 112 as shown and described with respect to FIG. 3. This final preparation and providing of the microdots 112 can be done prior to the substrate 104 being attached to the housing 120, which is preferred, but it can be done after it has been attached if desired.

As previously stated, the sealing layer 200 has a recess in the sealing layer overlying the substrate. This recess is located in a central region of the sealing layer. The sealing layer has a first height in the central region and a second, greater height in a peripheral region of the sealing layer. A recess 204 is positioned in the upper surface of the substrate, the recess being positioned below the recess in the sealing layer. The recess in the sealing layer is overlying at least a portion of the recess in the substrate. The ridge 206 in the upper surface of the substrate is positioned adjacent to the recess in the upper surface of the substrate and the recess in the sealing layer is overlying the ridge 206 in the substrate. The upper surface of the ridge 206 is in the same plane as an upper surface of the substrate at locations outside of the recess in the substrate, which includes locations positioned below the region of the sealing layer having the second, greater height. The microdots 112 are placed onto the substrate 104 at an appropriate time in the fabrication process. According to one embodiment, they are placed on the substrate 104 after the steps of FIG. 22 in which the housing 120 has been fully formed and the cartridge is completed. According to another embodiment, the microdots 112 are placed on the substrate 104 just prior to the step as shown in FIG. 21D, before the attachment of the housing 120.

In yet another alternative embodiment, after the cartridge is fully formed as shown in FIG. 22, an additional substrate is placed into the recess tool and on the ridge 206 having the microdots 112 formed thereon. In this alternative embodiment, the microdots 112 are formed on a substrate as shown in FIGS. 1-5B following the process steps as described therein. After the cartridge having the housing 120 is prepared, then the separately prepared substrate can be placed in each of the individual chambers 190. Accordingly, there are a number of acceptable techniques by which the microdots 112 may be positioned in each chamber 190. Additional sequence steps and fabrication techniques may also be used in order to form the microdots 120 within each chamber 190.

FIG. 23 shows a completed cartridge 127 having the housing 120 and the substrate 104 combined with each other. As can be seen, each chamber 190 has a recess tool therein with the ridge 206 and a film 212 which provides a reception location for the sealing layer 200 which can receive the sample fluid 122. Accordingly, after the cartridge 127 is prepared, a sealing layer, such as wax, oil, or other appropriate sealing material, will be placed therein. In one embodiment, the sealing layer is wax, which has a density that will be less than the density of the sample fluid 122 to be received therein. The sealing layer 200 is appropriately shaped as shown in FIG. 18 and remains with the indent therein in preparation to receive the sample fluid 122. In the embodiment in which the sealing layer 200 is wax, the cartridge 127 can be fully completed with the recess in the sealing layer 200 prepared to receive a sample fluid 122 at some time in the future. Accordingly, the structure shown in FIG. 18 is completed as a final product, except that the sample fluid 122 has not yet been placed into each of the chambers 190. A large number of cartridges 127 can be prepared and shipped to various locations for future in-field use. The cartridges 127 are in a stable condition, with each of the microdots 112 properly sealed and protected. Namely, as can be seen viewing FIG. 18, the sealing layer 200 will completely cover and fully protect and isolate each of the microdots 112. This will ensure that the microdots 112 cannot receive any contamination or material. Since the sealing layer 200 fully encases the microdots 112, they can be assured of remaining clean and isolated until the PCR process is started. Thus, the cartridges 127 can be shipped to any number of different customers at different locations and be assured of remaining in a contamination-free condition waiting for use when a sample fluid 122 will be introduced therein at a later time.

FIGS. 24-27 illustrate the introduction of the sample fluid 122 into physical contact with the microdots 112 and the movement of the sealing layer 200 to be on top of, and fully encase the sample fluid 122. As seen in FIG. 22, the heating coil 202 is heated up in order to apply a high temperature to the substrate 104. In the graph shown in FIGS. 24-27, the horizontal axis is time and the vertical axis is temperature, in degrees centigrade. In the embodiment shown, the sample fluid is water-based and therefore the acceptable temperature will generally be in the range of 60-95° C. The selected temperature will be somewhat below the boiling temperature of the sample fluid. If the sample fluid is water-based, then temperature somewhat below 100° C. is preferred. If the sample fluid 122 is alcohol-based, then a temperature somewhat below 75° C. is preferred, since most alcohols boil in the range of 75-80° C. In addition, the temperature range is then selected to be within the parameters for which the gene is amplified. Most genetic material is amplified by heating cycles that vary between 50° C. and 100° C., and in some situations, heating cycles that vary between 60° C. and 95° C. Accordingly, the maximum temperature to which the sample fluid 122 will be heated will be based upon boiling temperature of the sample fluid, with the temperature selected to be sufficiently below the boiling temperature of the sample fluid that there is no danger of the sample boiling and also lower than the temperature at which the gene material will be degraded or destroyed. The boundary of the lower temperature will be something sufficiently low to create a PCR cycle for amplification of the gene material, however, not so low as to harden the sample fluid 122. In addition, in most embodiments, it will be desired to keep the sealing fluid 220 in the liquid range. Accordingly, for a wax that has a melting temperature range of approximate 55° C., a lower temperature of approximately 60° C. is selected.

Figure 24:
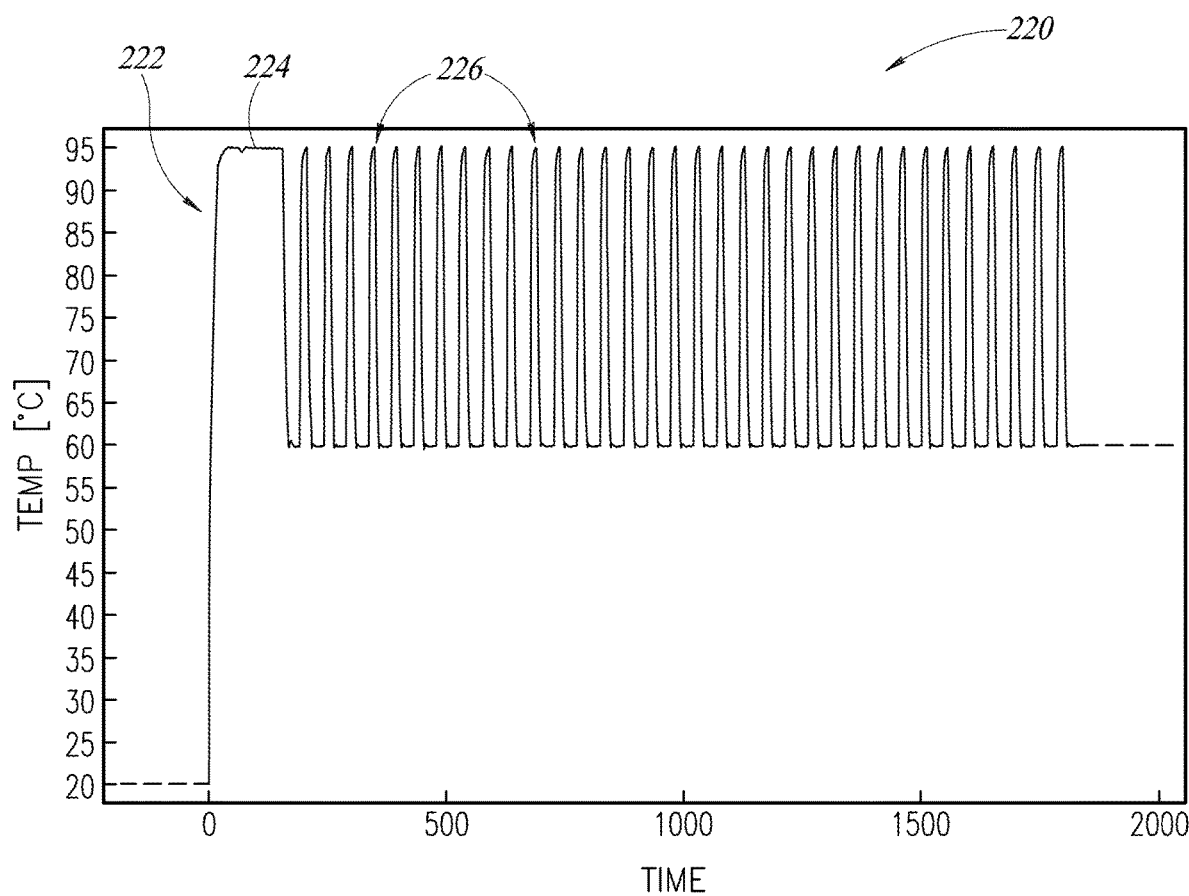
FIG. 24 is a graph showing the heating temperature of the chamber of FIG. 22 over time according to one embodiment.

Viewing FIG. 24, the heating of the heating coil 202 is shown by line 222 over time of approximately 2000 seconds. At time zero, the heating of the coil advances from room temperature, generally in the range of 22-27° C., and is rapidly advanced in less than a few seconds to approximately 95° C. The temperature stays elevated at approximately 95° C. for a plateau time, shown by the plateau 224. The length of the time for the plateau 224 is sufficiently long to ensure that the sealing material 200 has fully melted, that the sample fluid 122 has transitioned from on top of the sealing fluid 200 as shown in FIG. 18 to be in contact with the microdots 112 on top of the substrate 104 as shown in FIG. 19. In addition to the length of the time, the plateau 224 is sufficiently long to ensure good movement of the fluid 122 in order to provide for adequate mixing of the sample gene for presentation to the microdots 112. After a selected plateau time 222, preferably in the range of 5-50 seconds, then the PCR cycle begins by having repeated cycles 226 to a low temperature and back up to a high temperature. The repeating of the heating cycles 226 is carried out until the PCR process has been sufficiently completed to amplify any target material within the sample fluid 122 which may be present.

Figure 25:
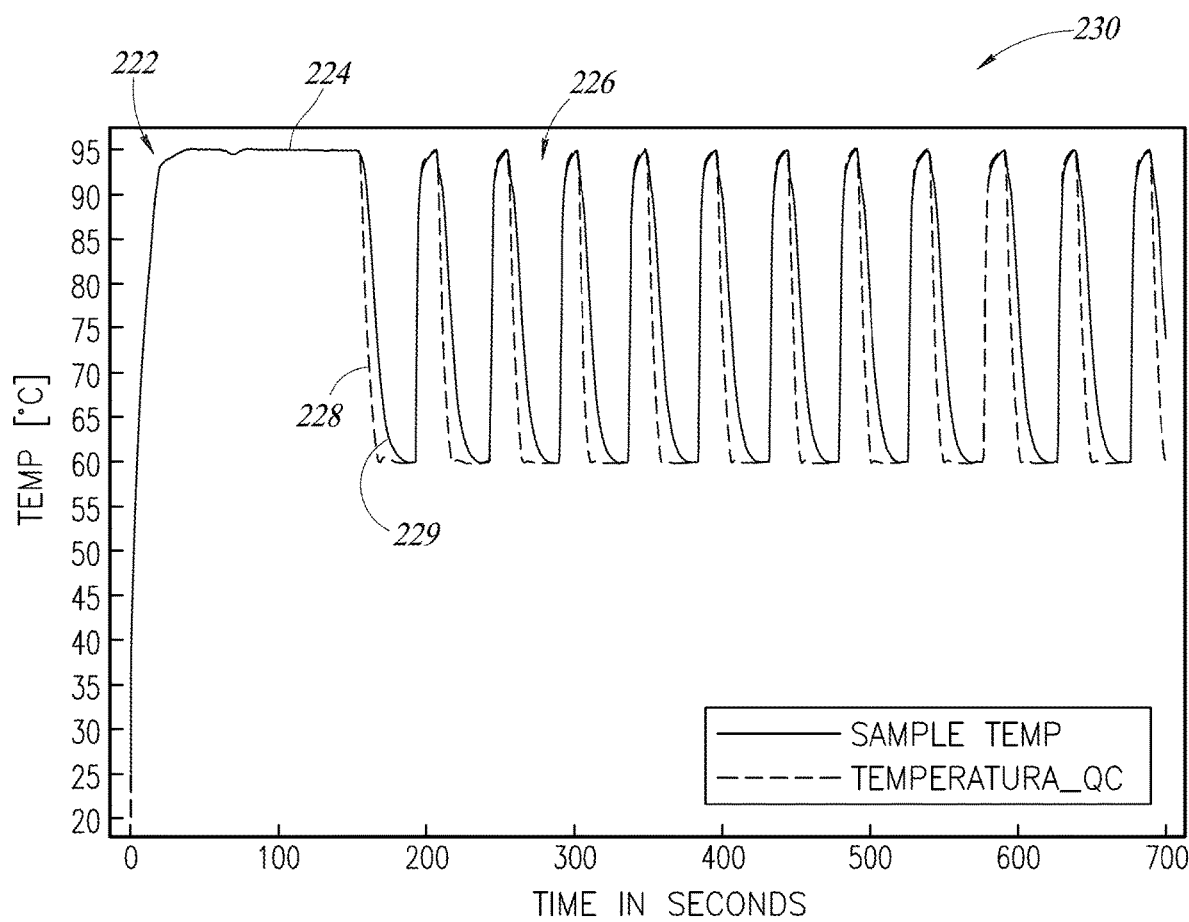
FIG. 25 is an enlarged view of a portion of the cycle of FIG. 24.

FIG. 25 illustrates one example 230 of a heating pattern having a number of PCR heating cycles 226 according to one embodiment. According to this embodiment, the sample temperature is shown by the solid line and the temperature of the heating coil 202 is shown by the dashed line. At time 0, the heating coil 202 starts to increase in temperature from ambient temperature which will generally be in the range of 20-25° C. and begins to heat up the substrate 104, which in turn heats up the sample fluid 122 as represented by the solid line. Silicon is highly thermally conductive and therefore when the substrate 104 is comprised of silicon, the temperature of sample fluid 122 will be approximately equal to the temperature of the heating coil 202. As shown in the graph 230, the temperature of the coil 202 will rise sharply as shown by the vertical line 222 until it reaches a plateau 224. For plateau time 224 of approximately 150 seconds the temperature of the heating coil 202 is approximately equal to the temperature of the sample fluid 122. After a selected time period, for example, 150-200 seconds, the first PCR cycle begins by a rapid drop in the temperature of the heating coil 202 is shown by line 228. As the temperature of the heating coil 202 reduces, shortly thereafter the temperature of the sample 122 will also decrease, as shown by solid line 229. Because the sample fluid 122 has more mass and a higher specific heat, it will not cool quite so quickly as the coil 202 and therefore will lag somewhat in its temperature decline. After a brief time period, for example, in the range of 8-12 seconds, the temperature of the sample fluid 229 will be approximately equal to the temperature of the heating coil 228. Then, the next stage of the PCR heating cycle begins with the coil 202 rapidly increasing towards the maximum temperature of about 95° C. The temperature of the heating coil 202 will be approximately equal to the temperature of the sample fluid 122, as shown in this embodiment, reaching the first peak as shown in the graph of 230. The cycle begins again, with the temperature of the heating coil 202 decreasing rapidly as shown by the dashed line 228 and then the sample fluid following to also decrease as shown by the solid line 229. The cycle 226 is repeated a number of times in order to provide the PCR amplification as is previously described herein.

Figure 26:
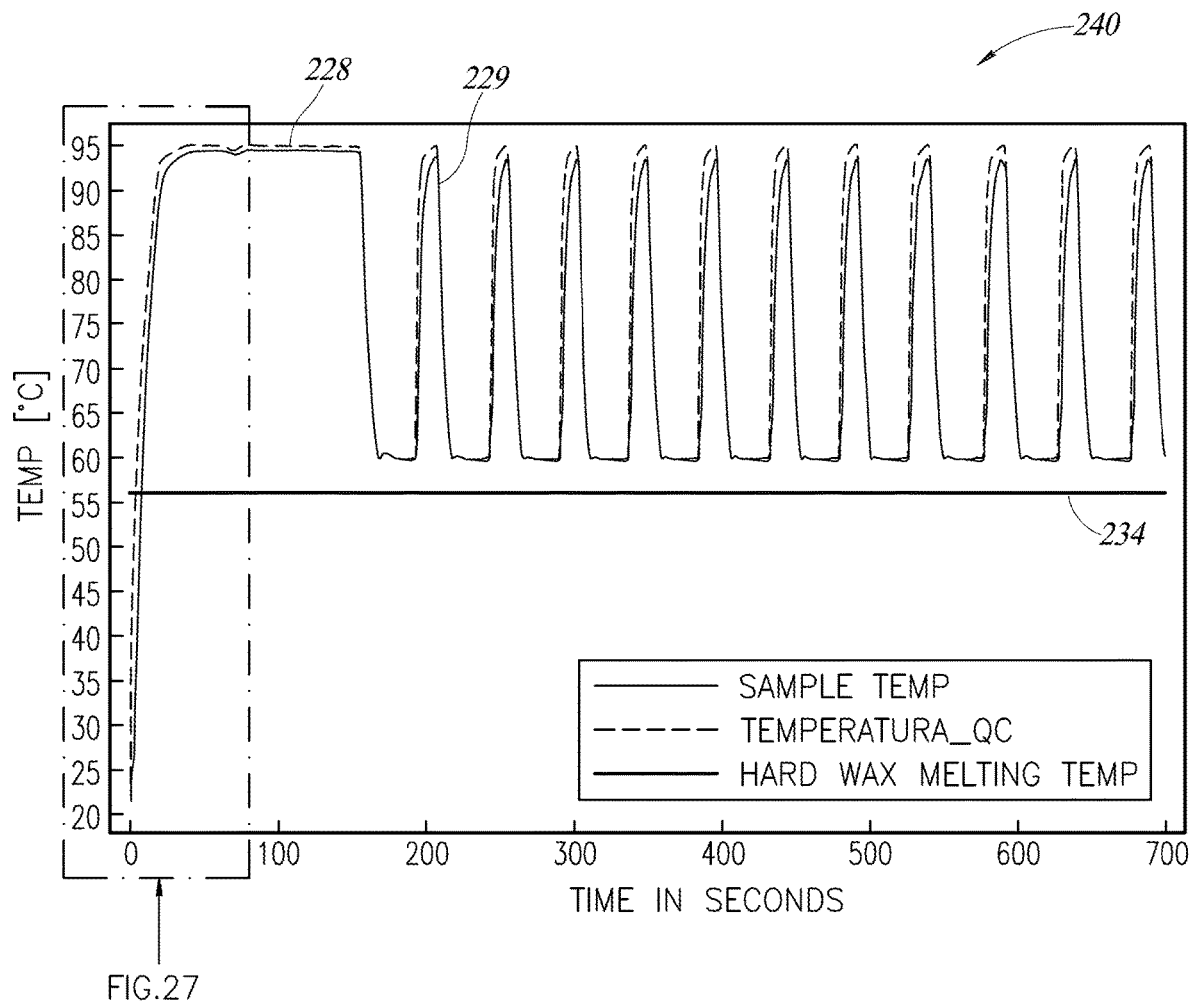
FIG. 26 is a further enlarged view of the heating of the chamber of FIG. 22 over time according to one embodiment.

FIG. 26 is an enlarged scale of a graph 240 which also shows thereon the melting temperature of the sealing material 200, in this case, wax. In addition, in the embodiment of FIG. 26, the temperature relationship between the heater 202 and the sample fluid 122 is slightly different. In the heating cycle 240, a wax that has a melting temperature of approximately 56° C. is used as shown by line 239. As the heater 202 heats up as shown by dashed line 228, the wax melts when the heater reaches slightly over 56° C. In addition, the sample 128 is slightly cooler than the heater 202 itself as can be seen by the separation between the line 228 and line 229, the sample temperature line. After the temperature of the heater 202 has reached a plateau and is held there for a selected period of time to ensure that the sample has reached a constant, stable temperature, than the heating and cooling cycles of the PCR amplification process begin. In this embodiment, the temperature of the sample closely matches the temperature of the heating coil 202 as the heating coil cools, and decreases in temperature towards approximately 60° C. Then, after a selected period time such as 10-20 seconds, the temperature of the heating coil begins to rise as shown by the dotted line graph 228 and the temperature of the sample fluid 122 follows closely with a rise in its temperature. This pattern continues for a number of cycles, in order to carry out the PCR amplification process.

Figure 27:
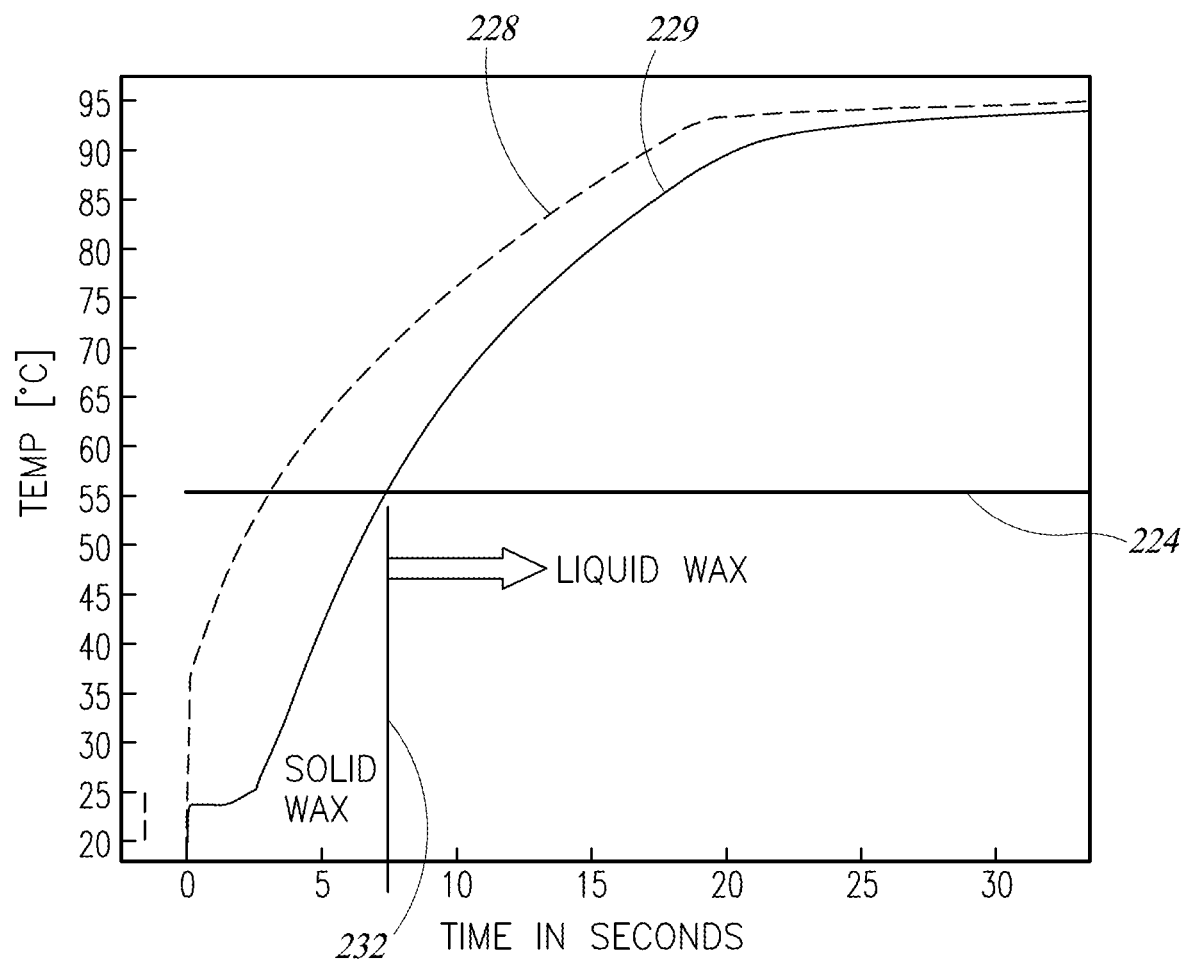
FIG. 27 is an enlarged view of a portion of the graph shown in FIG. 26.

FIG. 27 is an enlarged view of the section shown in FIG. 26. This view more clearly shows in detail the transition of the materials at different temperatures as the heater 202 increases in temperature. As can be seen, the heater 202 heats up rapidly following line 228 advancing from ambient temperature, for example, about 22° C. and rapidly climbing over about a 15-22° C. towards its maximum temperature of approximately 93° C. The wax remains solid while the heating coil 228 is below 55° C. but a few seconds after the coil 202 passes through 55° C., the sample fluid 228, along with the wax 200 also reach the melting temperature. The wax is shown by line 224 and the wax transitions to liquid wax at a time shown by vertical line 232, which is approximately 7.5 seconds after the heating cycle begins. There is therefore some slight delay from when the heater 202 reaches the melting temperature of wax until the substrate 104, the wax 200 and the sample 122 also reach the melting temperature of wax. This is based on the thermal properties of the substrate 104, the wax, the thickness of the wax, the volume of the sample 122, and other factors that affect the thermal properties of the wax 200. The wax remains in the liquid form as long as its temperature is above the melting temperature of wax shown which is generally in the range of 55° to 57° C. This occurs generally within the first 10 seconds of the heating cycle shown in FIG. 27 and the wax remains in the liquid form during the entire PCR heating cycles.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:

1. A method, comprising:
   preparing a first fluid by combining a first pair of selected forward and reverse PCR primers, saline buffer and at least one additive selected from dimethyl sulfoxide (DMSO), glycerol, and surfactants;
   preparing a second fluid by combining a second pair of selected forward and reverse PCR primers, saline buffer and at least one additive selected from the dimethyl sulfoxide (DMSO), glycerol, and surfactants;
   preparing a third fluid by combining a first single PCR primer, saline buffer and at least one additive selected from dimethyl sulfoxide (DMSO), glycerol, and surfactants;

preparing a fourth fluid by combining a second single PCR primer, saline buffer and at least one additive selected from dimethyl sulfoxide (DMSO), glycerol, and surfactants;
forming a first microdot by depositing a drop of the first fluid on a substrate;
forming a second microdot by depositing a drop of the second fluid on the substrate;
forming a third microdot by depositing a drop of the third fluid on the substrate;
forming a fourth microdot by depositing a drop of the fourth fluid on the substrate;
preparing the first, second, third and fourth microdots to receive a biological fluid;
placing the biological fluid containing a target gene material and fluorophores on the substrate and the first, second, third and further microdots;
amplifying the target gene material in the biological fluid that is in contact with the primers and on the first, second, third, and fourth microdots;
illuminating the first microdot and second microdot containing the target gene material with a fluorescence detection light concurrently with amplifying of the target gene material; and
outputting a positive test result if an intensity of a fluorescence output of the first microdot is higher than a selected threshold after a selected number of gene amplification cycles.

2. The method of claim 1, further including:
denaturing at least a portion of the amplified gene on the first microdot after the illuminating has occurred;
adding a specific beacon probe to the biological fluid;
illuminating the first microdot after the specific beacon probe has been added to the biological fluid; and
outputting an indication of a color of the first microdot.

3. The method of claim 1, further including:
applying a reactive epoxy coating to the substrate prior to forming the first microdot.

4. The method of claim 1 wherein the target gene material is SARS-CoV-2.

5. The method of claim 1 wherein the first pair of selected PCR primers can bind with gene strands of SARS-CoV-2.

6. The method of claim 1 further including:
annealing and stabilizing the PCR primers in the first, second, third, and fourth microdots after the step of preparing the first, second, third, and fourth microdots to receive the biological fluid and before the step of placing the biological fluid containing the target gene material on the substrate and the first and second microdots.

7. The method of claim 1 wherein the second pair of selected PCR primers can bind with gene strands of a different virus than a first virus.

8. The method of claim 1, comprising:
preparing a fifth fluid by combining a third pair of selected PCR primers, saline buffer and at least one additive selected from dimethyl sulfoxide (DMSO), glycerol, and surfactants;
combining gene strands of the target gene in the fifth fluid; and
forming a fifth microdot on the substrate by depositing a drop of the fifth fluid on the substrate.

9. The method of claim 1, wherein the drops are deposited via printing using a piezoelectric jet type of print head.

10. The method of claim 1 wherein, wherein the drops are deposited using a pipette.

11. A method, comprising:
applying a plurality of microdots on a substrate, each microdot of the plurality of microdots comprising saline buffer, at least one additive selected from dimethyl sulfoxide (DMSO), glycerol, and surfactants, and at least one PCR primer, at least one first microdot includes a first pair of PCR primers, at least one second microdot includes a second pair of PCR primers different than the first pair of PCR primers;
preparing the plurality of microdots to receive a biological fluid, the biological fluid including a target gene and fluorophores;
positioning the substrate having the plurality of microdots in a housing;
placing the biological fluid in the housing so that the biological fluid is on the substrate and covers the plurality of microdots;
amplifying the target gene in the biological fluid that is on the plurality of microdots;
illuminating the plurality of microdots containing the target gene with a fluorescence detection light concurrently with amplifying of the target gene; and
outputting a positive test result if an intensity of a fluorescence output of the plurality of microdots is higher than a selected threshold after a selected number of gene amplification cycles.

12. The method of claim 11, comprising at least one third microdot of the plurality of microdots having a first single PCR primer.

13. The method of claim 12, comprising at least one fourth microdot of the plurality of microdots having a second single PCR primer.

14. The method of claim 13, wherein the first and second single PCR primers are different.

15. The method of claim 12, wherein applying the plurality of microdots is carried out via inkjet printing.

16. A method, comprising:
forming a first microdot by depositing a drop of a first printing-fluid on a substrate, the first printing-fluid including a first pair of primers for gene amplification, saline buffer and at least one additive selected from dimethyl sulfoxide (DMSO), glycerol, and surfactants;
forming a second microdot by depositing a drop of a second printing-fluid on the substrate, the second printing-fluid including a first single primer for gene amplification, saline buffer and at least one additive selected from dimethyl sulfoxide (DMSO), glycerol, and surfactants;
annealing and stabilizing the primers of the first and second microdots, respectively;
placing a biological fluid containing a target gene material and fluorophores on the first and second microdots and the substrate; and
amplifying the target gene material on the first and second microdots, wherein the primers hybridize to the target gene material, and concurrently applying an excitation energy to the first and second microdots and the substrate.

17. The method of claim 16, wherein the applying the excitation energy is carried out by a laser light, UV light, argon laser, or LED light.

18. The method of claim 16, wherein forming the first and second microdots is carried out via inkjet printing.

19. The method of claim 18, wherein the inkjet printing is carried out at or below 30° C.

20. The method of claim 16, further comprising outputting a positive test result if an intensity of a fluorescence output of the first microdot is higher than a selected threshold after a selected number of gene amplification cycles.

* * * * *